Oct. 8, 1957 R. STUART-WILLIAMS 2,809,367
MAGNETIC CORE MEMORY SYSTEM
Filed April 5, 1954 11 Sheets-Sheet 1

RAYMOND STUART-WILLIAMS
INVENTOR
BY Lyon & Lyon
ATTORNEYS

Oct. 8, 1957 R. STUART-WILLIAMS 2,809,367

MAGNETIC CORE MEMORY SYSTEM

Filed April 5, 1954 11 Sheets-Sheet 2

RAYMOND STUART-WILLIAMS

INVENTOR

BY Lyon & Lyon

ATTORNEYS

MAGNETIC CORE MEMORY SYSTEM

Filed April 5, 1954 11 Sheets-Sheet 3

RAYMOND STUART-WILLIAMS

INVENTOR

BY Lyon & Lyon

ATTORNEYS

RAYMOND STUART-WILLIAMS
INVENTOR
BY Lyon & Lyon
ATTORNEYS

RAYMOND STUART-WILLIAMS

INVENTOR

BY Lyon & Lyon

ATTORNEYS

Oct. 8, 1957 R. STUART-WILLIAMS 2,809,367

MAGNETIC CORE MEMORY SYSTEM

Filed April 5, 1954 11 Sheets-Sheet 6

RAYMOND STUART-WILLIAMS

INVENTOR

BY Lyon & Lyon

ATTORNEYS

Oct. 8, 1957 R. STUART-WILLIAMS 2,809,367

MAGNETIC CORE MEMORY SYSTEM

Filed April 5, 1954 11 Sheets-Sheet 7

RAYMOND STUART-WILLIAMS

INVENTOR

BY Lyon & Lyon

ATTORNEYS

MAGNETIC CORE MEMORY SYSTEM

Filed April 5, 1954 11 Sheets-Sheet 8

RAYMOND STUART-WILLIAMS

INVENTOR

BY Lyon & Lyon

ATTORNEYS

RAYMOND STUART-WILLIAMS
INVENTOR
BY Lyon & Lyon
ATTORNEYS

MAGNETIC CORE MEMORY SYSTEM

RAYMOND STUART-WILLIAMS

INVENTOR

BY Lyon & Lyon

ATTORNEYS

MAGNETIC CORE MEMORY SYSTEM

Filed April 5, 1954

RAYMOND STUART-WILLIAMS

INVENTOR

BY Lyon & Lyon

ATTORNEYS

United States Patent Office 2,809,367

Patented Oct. 8, 1957

2,809,367

MAGNETIC CORE MEMORY SYSTEM

Raymond Stuart-Williams, Pacific Palisades, Calif., assignor, by mesne assignments, to Telemeter Magnetics and Electronics Corporation, Los Angeles, Calif., a corporation of New York Application April 5, 1954, Serial No. 420,829

15 Claims. (Cl. 340—174)

This invention relates to static magnetic memory systems and, more particularly, to improvements in the construction and operation of magnetic core memory systems.

In an article by J. W. Forrester entitled Digital information storage in three dimensions using magnetic cores, found in the Journal of Applied Physics, volume 22, pages 44 to 48, January 1951, there is described a coincident current magnetic core memory. A further description of this type of memory is found in an article by Jan A. Rajchman entitled Static magnetic matrix memory and switching circuits, in the RCA Review, volume 13, pages 183 to 201, for June 1952; and the latest work by Dr. Rajchman on magnetic core memories is found in the October 1953 Proceedings of the IRE entitled a myriabit magnetic-core matrix memory, pages 1407 to 1421. These articles describe a magnetic memory consisting of cores of magnetic material capable of saturation in either of two polarities, which may be designated as "P" or "N" and which may be driven from one to the other. The cores usually take the form of small toroids. The preferred hysteresis characteristic for magnetic material of which these cores are made is rectangular. Accordingly, to drive a core from "P" to "N" or vice versa there is a definite minimum or critical magnetomotive force required to be applied, or the core stays where it was before the force was applied. Less than this magnetomotive force can provide some magnetic excursion, but essentially the saturated condition in the particular polarity of saturation remains.

As shown in the articles, these cores are arranged in columns and rows. A different coil is inductively coupled to all the cores in each column. Each of the coils is known as a column coil. A different coil is inductively coupled to all the cores in each row. Each of these coils is known as a row coil. A single reading coil is inductively coupled to all the cores in the memory. Selection of a core for storage of digital information is made by exciting a row coil and a column coil coupled to that core with sufficient current to drive that core to "P" or "N," depending on whether the information sought to be stored is a "1" or a "0." The currents applied to the row coil and the column coil are each less than the critical value. However, any core receiving the effects of these currents coincidently receives a magnetomotive force in excess of the critical value and, therefore, is driven to saturation. For determining the storage condition of a core, drives are always applied to drive it toward a given polarity. If already at this polarity, no voltages are induced in the reading coil, and, if not in this polarity, then a voltage is induced in the reading coil. These concepts are described in detail in the above-noted articles.

It is interesting to note in the articles that these same magnetic cores may also be employed as switches for the purpose of driving a memory. Furthermore, in addition to being suitable for a two-dimensional storage array, the cores may also be used to provide a three-dimensional storage array, wherein a plurality of two-dimensional storage planes are simultaneously driven and inhibiting excitation is used selectively. This permits a word, consisting of a number of binary digits, to be stored in a three-dimensional magnetic memory, one bit being stored in each plane in a corresponding position.

In perusing the literature on magnetic core storage, it will be noted that in almost every instance the highest speed possible is attempted to be attained with these memories. However, if a magnetic memory of this type is considered from a design standpoint, it is found that when this memory is sought to be fitted into an actual high-speed digital computer, the time actually taken to operate the magnetic memory for writing or reading is small, compared to the other operating times of such computer. Hence, it is possible to operate a magnetic core memory at a much lower rate than was originally conceived without decreasing the over-all operating rate of a computer by any noticeable factor.

In the operation of magnetic matrices, it is noted that as the size of the matrix is increased the ratio of desired to undesired signal at the output of the reading coil is reduced. When reading coils are checkerboarded, i. e., the sense of the winding on each core is reversed and all the cores selected are chosen to have extremely uniform characteristics, a first order of cancellation is achieved. However, with an increase in the matrix size, the number of uniform cores required is increased. Since the art has not yet reached the point where cores can be made uniformly in every instance, either a large and costly number of rejects is obtained, or the matrix size attainable rapidly approaches a limit, or the uniformity requirements for the cores is reduced, with consequent complexities in driving and reading circuitry, in order to overcome the effects produced by the reduced uniformity requirements. One of the effects is to require absolutely uniform driving currents. The current applied to the cores may be more readily maintained uniform if vacuum tubes are employed and the drive is direct. Uniform driving currents are difficult to obtain using magnetic switch drives. It is preferred to employ switch drives, however, as they are much cheaper and more reliable in reducing the number of vacuum tubes employed.

When a core in a memory is driven, as by either a column coil or a row coil excitation, it has a magnetic cursion. when the drive is removed, it does not return to the same magnetic position from which it originally started, but it may return to a position in a slightly less saturated region. Successive partial drives can cause successive and different magnetic excursions. These effects are due to the core traveling around different minor hysteresis loops with the different excitations. These are known as the delta effects, and can be found described in detail in an engineering report by E. A. Guditz entitled Delta in Ceramic Array No. 1, E488, October 14, 1952, which is obtainable from Massachusetts Institute of Technology. Cores in a memory, which are not selected but which are in a row and column in which a selected core is included, receive the partial drives and, accordingly, are not left in the same magnetic positions. When reading is desired, as briefly described previously, the selected core is driven, and the presence or absence of an induced voltage in the reading coil is indicative of the condition of the selected core. However, with delta effects, among others, voltages are induced in the reading coil from the partial driven cores which are not canceled by the checkerboarding of the reading winding which can become sufficiently large to mask the signal from the selected core.

An object of the present invention is to provide a method and means for operating a magnetic matrix memory which provides a better wanted-to-unwanted reading signal ratio than heretofore obtainable.

A further object of the present invention is to provide a novel and improved reading system for a magnetic matrix memory wherein induced reading voltages are integrated with the same relative polarities as when they were induced.

Still a further object of the present invention is to provide a novel and improved reading system which permits an accurate determination of the polarity of magnetic cores in a matrix memory.

These and other objects of the invention are achieved in a magnetic memory array wherein the reading coil is inductively coupled to each one of the cores in the array by a different winding having one or the other coupling sense to reduce unwanted reading signals. The sense of the winding is determinable in accordance with the location of a core in the array. For reading the condition of a selected core, the core is driven toward saturation at one polarity in the usual manner by applying driving currents to the row and column coils coupled to the selected core. The voltages induced in the reading coil as a result of this drive are converted to push-pull voltages. These are applied in push-pull to a pair of integrating networks which are normally biased off. However, during the interval of driving the core, as determined from the location of the selected core, one of the pair of integrating networks is permitted to integrate to insure that all of the induced reading voltages are integrated with the same relative polarities as when they were induced. If the selected core was saturated in the same polarity as the one to which it is urged by the drive, there will be substantially no integrated voltage output at the end of the drive. If the selected core was saturated in the opposite polarity, there will be an integrated voltage output present at the end of the drive.

In a copending application for a Magnetic Core Memory System, by Milton Rosenberg, Matthew Arnold Alexander, and this inventor, filed April 5, 1954, Serial No. 421,142, there is described a magnetic core memory system which, for reading, employs the invention to be described herein.

The novel features that are considered characteristic of this invention are set forth with particularity in the appended claims. The invention, itself, both as to its organization and method of operation, as well as additional objects and advantages thereof, will best be understood from the following description when read in connection with the accompanying drawings, in which:

In the following description of the magnetic memory core system, for convenience in description, a row coil may be referred to as the "Y" line of the matrix and the column coil may be referred to as the "X" line of the matrix. By "row coil" is to be meant the coil coupling all of the cores in a given row in a matrix. By "column coil" is to be understood, similarly, the coil coupling all of the cores in a column of the matrix. The "reading coil" is the coil coupling all of the cores in the matrix so tha driving one or more of the cores induces voltages in the reading coil. By "delta effect" is meant, as previously stated, the effects caused by cores traveling on different minor hysteresis loops with different drives.

Figure 1:
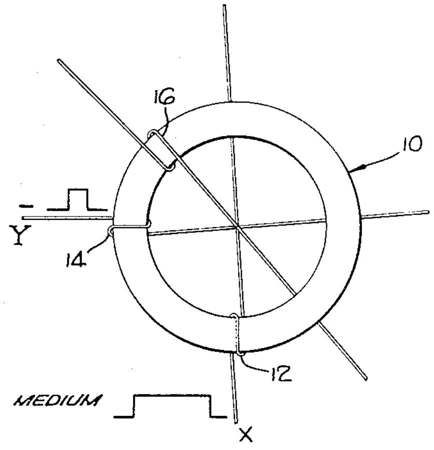
Figure 1 represents a core and its associated windings in a magnetic memory matrix.

*The principles of the proposed system.*—The presently known principle of operation of magnetic core matrices requires that two equal current pulses should be coincident at a selected core, the sum of the current being sufficient to change the state of the core, while one pulse alone is insufficient. If maximum speed of operation is required, these pulses should be as short as possible and exactly coincident. Considerable thought has been given in the past to ensure exact time coincidence. However, if time is not too important, one pulse may be much longer than the minimum possible value. This pulse is established first, the shorter pulse occurring later. Figure 1 shows a toroidal storage core 10 of a type suitable for use in a magnetic matrix memory. The core has three windings 12, 14, 16 inductively coupled thereto. One winding 12 is part of a column coil or "X" line, a second winding 14 is part of a row coil or "Y" line, and the third winding 16 is part of the reading coil used in a magnetic memory. A long pulse is applied to the X line of the matrix and a short pulse is applied to the Y line during the long pulse.

Figure 2:
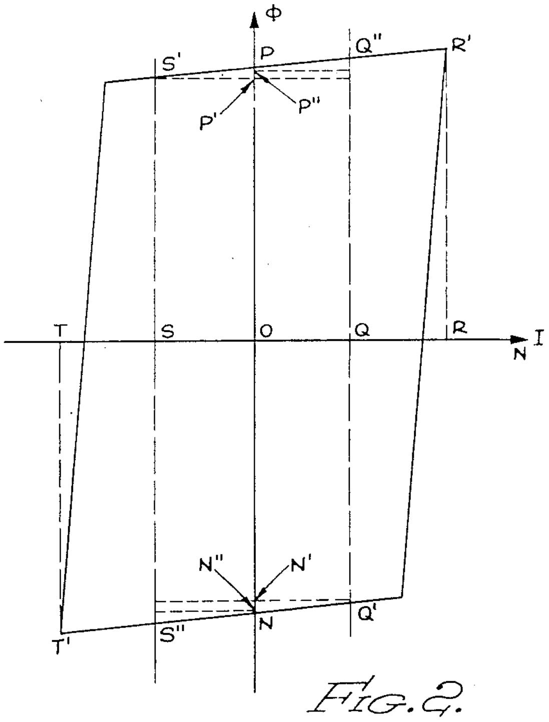
Figure 2 represents a typical hysteresis characteristic shown for the purpose of assisting in the explanation herein.
Figure 3:
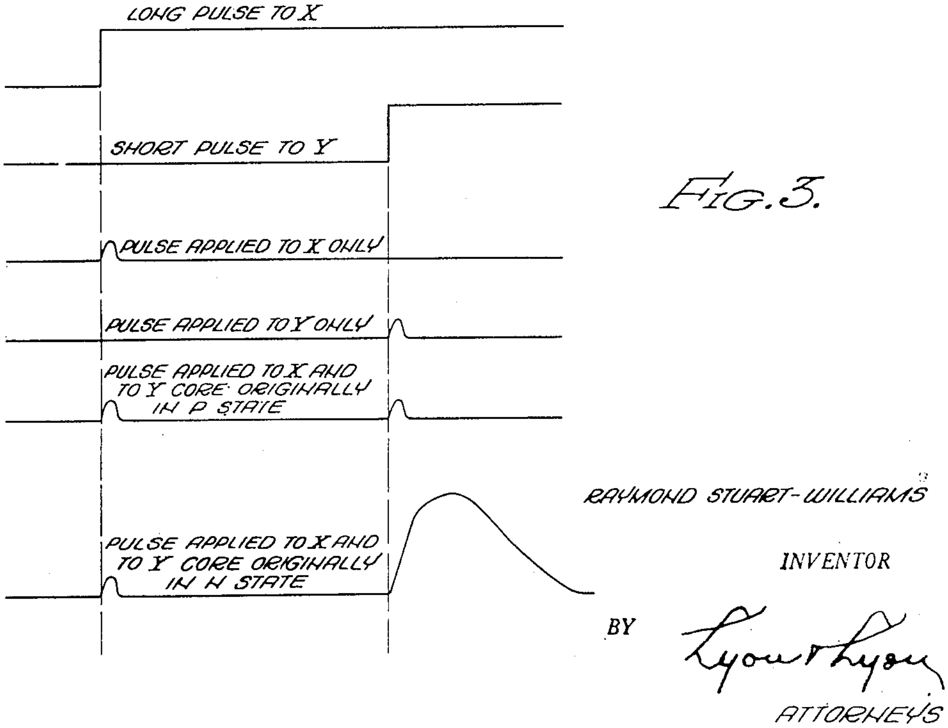
Figure 3 represents typical wave shapes obtained in a reading coil in a matrix excited by long and short pulses.

A typical hysteresis loop of a storage core 10 is shown in Figure 2. The core is said to be storing "0" if at state P or to be storing "1" if at state N. The magnitude of the magnetomotive force, or M. M. F., provided by the X or Y line is represented by amount "OQ." Provided the turns are fixed, the M. M. F. can be expressed in terms of the current flowing in the wires. If a single pulse of current is applied to the core, it will move first to Q′ or Q″, depending on whether it was storing at N or P. When the pulse is released, it will move back to the axis to a point very near N or P. Since the top and bottom portions of the loop are not exactly horizontal, some output will appear in the reading winding as a result of these excursions. If now both pulses are applied, the pulse will move first to Q′ or Q″, as before. When the Y pulse commences, the core will move to R′. When the Y pulse finishes, the core will move to Q″, and, when the X pulse finishes, the core will move to P. If the core was originally at P, the excursion Q″R′ will occur during the Y pulse. This will produce a signal in the reading coil that is approximately equal to that produced by a PQ″ movement. If the core was at N, the excursion Q′R′ will occur during the Y pulse. This will cause a very large signal output. Thus, the only time at which a large signal can be produced in a selected core is during the Y pulse and if the selected core was storing in state N. The pulses occurring in the reading coil are illustrated in Figure 3. This shows the X pulse or column coil pulse, the Y pulse or row coil pulse, the effects of the single application of these pulses in the reading coil, and the effects of the combined application of these pulses when a core is in P and when a core is in N.

This process of driving a matrix makes it possible to separate the occurrence in time of the disturbing pulses due to the X selection and those due to the Y. If now, reading is commenced at the beginning of the Y pulse after any disturbance due to the X pulse has finished, only those cores on the selected line in the Y direction cause disturbance. In a square array, only half the energized cores contribute to the disturbance, and, therefore, the undesired signal at the output due to nonuniformity of the cores is reduced by $\sqrt{2}$ as this is a random effect. This always assumes that the normal compensating type of reading winding has been employed, for example, the checkerboard in which the windings on alternate cores are arranged so that disturbing signals of opposing polarity are induced therein and hence tend to cancel each other. The delta effect, however, increases linearly with the number of cores disturbed, and, therefore, this is reduced by two.

In a large matrix, the delta effect is more important than errors due to nonuniformity, and, therefore, the more important quantity is reduced by the major amount. This improvement can be made larger still by making the matrix rectangular instead of square. For example, a 4096 bit matrix can be assembled either as 64 by 64, 128 by 32, 256 by 16, and so on. If, now, the longer pulse drives the line linking the greater number of cores and the shorter pulse drives the line with the smaller number of cores, the disturbance is reduced still more.

This is illustrated in the following table with respect to a 4096 bit matrix.

| Matrix Configuration | Relative Delta Effect | Relative Nonuniformity Effect | Number of Driving Lines to Matrix |
|---|---|---|---|
| 64 x 64 | 0.5 | 0.707 | 128 |
| 32 x 128 | 0.25 | 0.5 | 160 |
| 16 x 256 | 0.125 | 0.354 | 272 |
| 8 x 512 | 0.0625 | 0.25 | 520 |

The relative figures above refer to a symmetrically driven square matrix as unity.

The extra driving lines represent additional external circuits. Hence the important figure is the product of the relative delta effect and the number of driving lines. This is 128 for a normal 64 x 64 matrix. For the four cases above, it is 64, 40, 34, and 32.5. Hence within the range shown, there is always a net improvement due to using a rectangular matrix with this system. The value of the product falls very rapidly initially, but in the system used, as an illustration, the lowest value of the product is 32, for the case of 4096 x 1 way matrix. It is considered that the 128 x 32 way system is to be preferred, as the product is very near its lowest value; the increase in lines is only 25 percent, but the reduction in delta is a factor of 4. In fact, since only 32 cores can contribute to the undesired signal, the output signal is directly equivalent to that received from a 256 bit matrix. Hence, by this means, it has been possible to make a matrix having 16 times the capacity without increasing the value of the undesired signal.

If more time is permitted, the long X pulse should rise very slowly. The output occurring during this pulse is then very small as the rate of rise of current and hence output voltage is small. Thus the early pulses can be completely neglected. This has an additional advantage that the voltage drop in the X windings is small, simplifying the problem of driving the large number of cores on this winding which is inherent in the use of the rectangular matrix.

If one considers the disturbance occurring in the reading coil at the time of application of the Y pulse, it is as follows:

Flux due to selected core moving from Q′ or Q″ to R′.

Flux due to seven unselected cores moving from N to Q′ or from P to Q″.

Flux due to eight cores moving from N to Q′ or P to Q″. These cores will be linked in the opposite polarity to the selected core and the previous seven unselected cores.

When the core turns from Q′ to R′, the output from the selected core is so large that it is not necessary to consider the effect of the interference. When the core moves from Q″ to R′, the results are much more important.

*Best cases*

$$Q''R'+7(PQ'')-8(PQ'')=Q''R'-PQ''$$

or $$Q''R'+7(NQ')-8(NQ')=Q''R'-NQ'$$

If the cores are very uniform, the results in both cases are very nearly 0. These are equations which are disturbed by lack of uniformity of the cores.

*Worst cases*

$$Q''R'+7(PQ'')-8(NQ')$$

or $$Q''R'+7(NQ')-8(PQ'')$$

If PQ″ is not equal to NQ′, the result is not 0. This is generally known as delta effect and lies in the fact that the operating excursions in the P region are not the same as in the N region. This effect is extremely objectionable, as it means that the undesired signal varies with the information stored. It will be shown later herein that by a correct choice of the method of driving the cores the delta effect can be reduced considerably.

In reading the output obtained in a reading coil, the method of strobing, or reading the voltage induced in the reading coil after amplification and rectification during an interval after the transients occurring as a result of partial drive and air pickup have subsided and before the voltage induced by driving the selected core has subsided, was a method that found, and still finds, great favor. However, when it is desired to go to a three-dimensional storage system of the type described by Forrester, the control circuits required to generate accurately timed strobing pulses for the many parallel memory planes of the system becomes extremely cumbersome. In addition, circuits which are required to produce an accurately controlled time delay are inherently unreliable. It is preferable, in order to avoid these limitations and difficulties, to integrate the signal from the reading winding in a manner so that the output from the integrator represents the flux excursion of the cores.

Using integration, the reading system is not time dependent. One system of integration is described in the article by Rajchman. The theory behind integration may be understood from the following explanation. Referring now to Figure 2, again there is shown an idealized rectangular hysteresis loop. OS represents a negative half magnetomotive drive; OT represents a negative full magnetomotive drive. By half and full M. M. F. drives are meant, respectively, the drives due to current in either the X or Y line and the drive due to currents in both lines concurrently.

The main basis of this form of reading is that if a core is storing at N and receives a 1/2P current and then a 1/2N current, it moves first to Q′ and then to N′, back to the SS″ line, and finally to N″. A similar action takes place if a core is at P′ and receives a 1/2P-1/2N cycle. During this and any subsequent action, these minor loops tend to close, i. e., N″ is very near N. The closure of this loop improves as more 1/2P-1/2N cycles are applied, and, after five or six cycles, the loops are so nearly closed that it is not possible to detect any error.

Hence, if integration proceeds over two beats or a cycle of 1/2P-1/2N, the signal due to disturbed cores is effectively zero.

Figure 4:
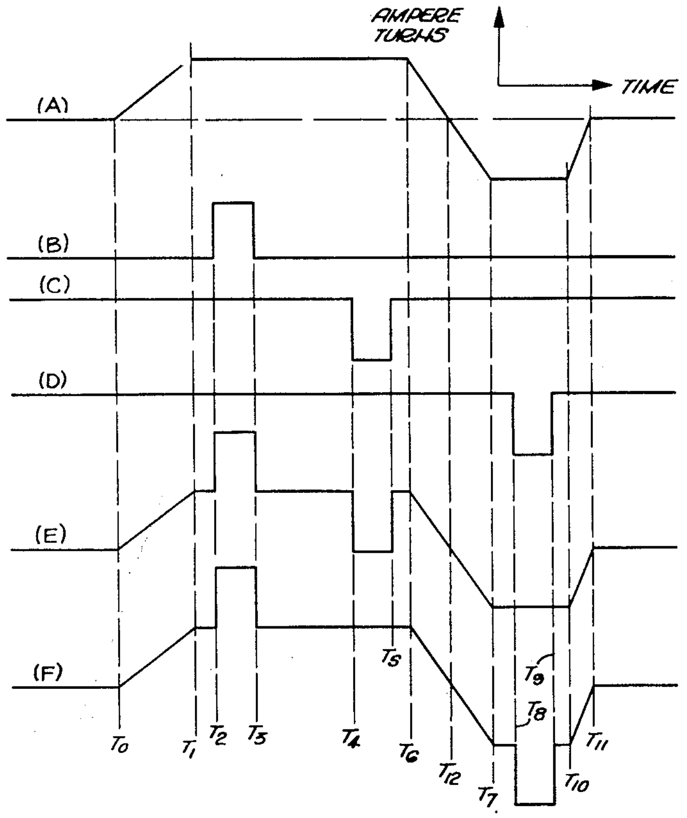
Figure 4 represents the current waveforms required for operating a matrix in accordance with a pref rred program embodying the invention.

Figure 4 shows the current waveforms applied to the X and Y lines to achieve a preferred method of operation of a magnetic matrix memory.

Waveform A is applied to a selected X wire. It commences at time $T_0$ and rises slowly to its maximum possible value by time $T_1$. Its rise time may be on the order of a turnover time of a core. It then remains at this value, producing a magnetomotive force represented by OQ in Figure 2 until time $T_6$. The duration of the plateau time of waveform A is on the order of a multiple of the turnover time of a core. It then changes from its maximum positive value to its maximum negative value, producing a magnetomotive force represented by OS in Figure 2 by time $T_7$. It then remains at this value until time $T_{10}$, when it decays to zero by the final time $T_{11}$. The negative portion of the waveform may be substantially the same in duration, amplitude, and rise time as the positive portion, or it may even have a shorter duration for reasons appearing later.

Waveform B is applied to the selected Y line between times $T_2$ and $T_3$. $T_2$ follows $T_1$ by a time sufficient to allow all disturbance due to the application of waveform A to have subsided. This is usually on the order of the turnover time of the cores used. The amplitude of the pulse is equal to that of the positive part of pulse A. The duration, $T_2$ to $T_3$, is sufficient to allow the selected core to move from state N to state P completely, this being on the order of the core turnover time.

A time delay $T_3$ to $T_4$ allows sufficient time to complete the reading process and to transfer the information determining whether the core is to be set to P or N.

If it is desired to leave the core at P, a current pulse C is applied to the Y line during times $T_4$ to $T_5$. This pulse has exactly the same characteristics as B, except that it is negative going. The time $T_5$ to $T_6$ is inserted to reduce the requirement for accurate timing.

If it is desired to reset the core to N, pulse D is applied to the Y line instead of pulse C. This pulse has the same shape and amplitude as pulse C. Its duration $T_8$ to $T_9$ is less than $T_7$ to $T_{10}$ to remove the need for accurate timing.

The magnetomotive force applied to the selected core, if it is finally set to P, is shown in waveform E. The magnetomotive force applied to the selected core when it is set in N is shown in waveform F.

The force applied to an unselected core on a selected X line may be represented by wave shape A. The force applied to an unselected core on a selected Y line may be represented by wave shapes B and C or B and D. Hence, any energized unselected core receives equal forces in both directions during the cycle. By an unselected core is meant a core which is inductively coupled to either an energized column coil or row coil but not to both. The core coupled to both is a selected core and will be driven to P or N as shown by wave shapes E or F.

Reading is commenced in the cycle at time $T_2$ and finishes by time $T_4$. Hence, only the disturbance due to the Y current pulse is read, since by the time the reading commences the disturbance due to the application of the X current pulse has subsided.

One important advantage of this system for driving cores is that cores need to be uniform in any single Y line only, as this is the place in which disturbances are significant. This has two results. First, a large number of grades of cores may be used so that all good storage cores may be incorporated in the equipment. In fact, the acceptance figure is 80 percent, rather than 25 percent, for previous methods of using cores. Secondly, the cores in any Y line may be made extremely uniform, so uniform, in fact that nonuniformity effects can be neglected. When this method of driving the cores is employed for a rectangular matrix having, for example, more columns than rows, with the X drive being applied to the column coils and the Y drive to the row coils since there are fewer cores in each row, the number of required uniform cores is considerably reduced.

Consider the case of a core being set to P employing the X and Y drives represented, respectively, by wave shapes A and B. By time $T_1$, the core has moved either to Q′ or Q″ in Figure 2, depending on whether it was at N or P to begin with. By time $T_3$, it is at R′. By time $T_4$, it is at Q″. By time $T_5$, it is at P. It then returns to Q″ and then through to S′ by time $T_{10}$. By time $T_{11}$, it has moved to P′.

In a similar manner, a core being set to N finally ends at N. Hence, P′ and N are the initial storage points. In accordance with this method of driving, any subsequent disturbances of the core when it is not in the selected position are of the 1/2P-1/2N type. A core at N will move to N″ under the influence of the first disturbance. During the 1/2P portion of the cycle, a core at N moves from N to N′, a core at P moves from P′ to P″. However, the original drive action and any subsequent disturbances are symmetrical. Hence, P′P is equal to N′N. Since P″ is very near P, then P′P″ is very nearly equal to NN′. This equality will improve with subsequent disturbances. Hence, if the cores are chosen in pairs and the reading coil is wound so that the voltage output of each member of the pair is induced in an opposing manner in the reading coil, the output from them will be zero if both cores are in the same state and PP″ if they are in opposite states. It is known that this amount is very small.

Consider 32 cores on a Y line to be driven. In order of cycling history, with the lowest first, there can be:

(1) The selected core;
(2) The core just previously selected;
(3) Core with one disturbing cycle;
(4) Core with two disturbing cycles;
(5) Core with three disturbing cycles; and so on.

If we take the cores in pairs 1 and 2, 3 and 4, 5 and 6, 7 and 8, 9 and 10, etc., the pairs commencing 9 and 10, and so on, will give zero output as they have received a sufficient number of cycles to settle. Pairs from 3 and 4 to 7 and 8 will give small outputs; the largest of these will be much smaller than PP′.

The selected core when driven to P can move from a point near Q″ to R′ or from Q′ to R′. The core which opposes it can move from P′ to P″ or from N to N′.

The output will be less than PR′ if the selected core was in P and about Q′Q″ if the selected core was in N. Thus, the core in P will not provide a completely zero output in the reading coil; however, it will be very small.

It will be seen that the behavior of this system during the reading interval is analogous to the behavior of a system which uses a two-beat reading integration cycle, namely, one which first is driven positive and then negative. This is made possible by the application of symmetrical driving forces on the cores at all times so that they are left at the proper point of their hysteresis characteristic curve at the completion of either a writing or reading cycle.

A cycle which was very popular at one time was to apply the X and Y 1/2N pulses at different times. This resulted in two 1/2N actions on a core after it was first set to P. This inserted an initial assymmetry into the minor loops which made it necessary to employ a more complex form of integration over two beats.

Figure 5:
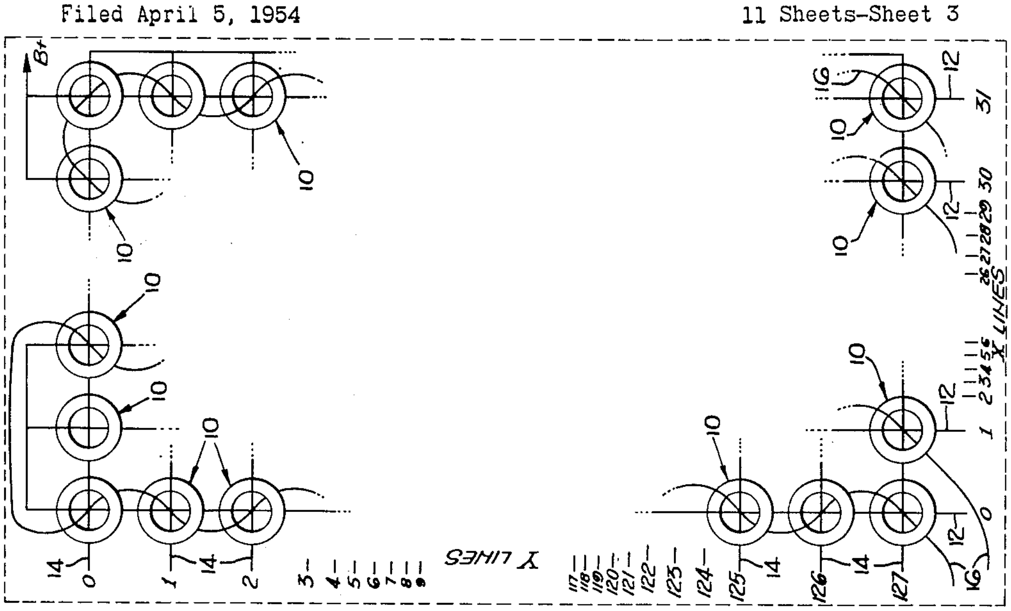
Figure 5 is a schematic diagram of a magnetic core memory with cores disposed in a rectangular array.

Referring now to Figure 5, there will be seen a vestigial schematic diagram of a magnetic core matrix memory in a rectangular array of 32 x 128. The X drive is applied to a selected one of the 32 column coils 12 and the Y drive is applied to a selected one of the row coils 14. A core 10 coupled to the excited X and Y line or row and column coil is the desired core. Current is applied to the coils either from the vacuum tubes or magnetic switches (not shown), as desired. As indicated previously, it is preferred, with the program herein described, to apply current to the column coils using vacuum tube drives and to apply current to the row coils using a magnetic switch drive. A reading coil 16 is interlaced in the memory. It is coupled to all the cores.

Since reading occurs, in accordance with the program herein described, only after the disturbance caused by application of the column coil current has subsided, a great saving in time and effort in constructing the memory is afforded. One of the most difficult windings to insert in the memory is the winding required for the reading coil. Heretofore, double checkerboarding, that is reversing the reading winding sense with every core, was required with programs where both X and Y drives occurred simultaneously in order to cancel the disturbances caused by both drives. In view of the programs described in the subject embodiment of the invention, checkerboarding is required only in the Y direction, since there is no X disturbance at the time of reading. This simplifies winding the reading coil tremendously. If the columns of the matrix are numbered from 0 to 31 commencing with the column on the left, the winding goes up through all the cores in column 0 in one sense, comes down through column 2, up through column 4, thus lacing back and forth through all the even-numbered columns. When column 30 is reached, the winding is next laced through column 31 and then interlaced through the odd-numbered columns to be brought out at column one. This eliminates air pickup in the Y direction, due to the fact that the reading winding is normal to drive from the row coils. Furthermore, a convenient terminal point for the reading coil is provided, since the amount of pickup is reduced when connecting the coil through a twisted pair of wires to other apparatus.

Figure 6:
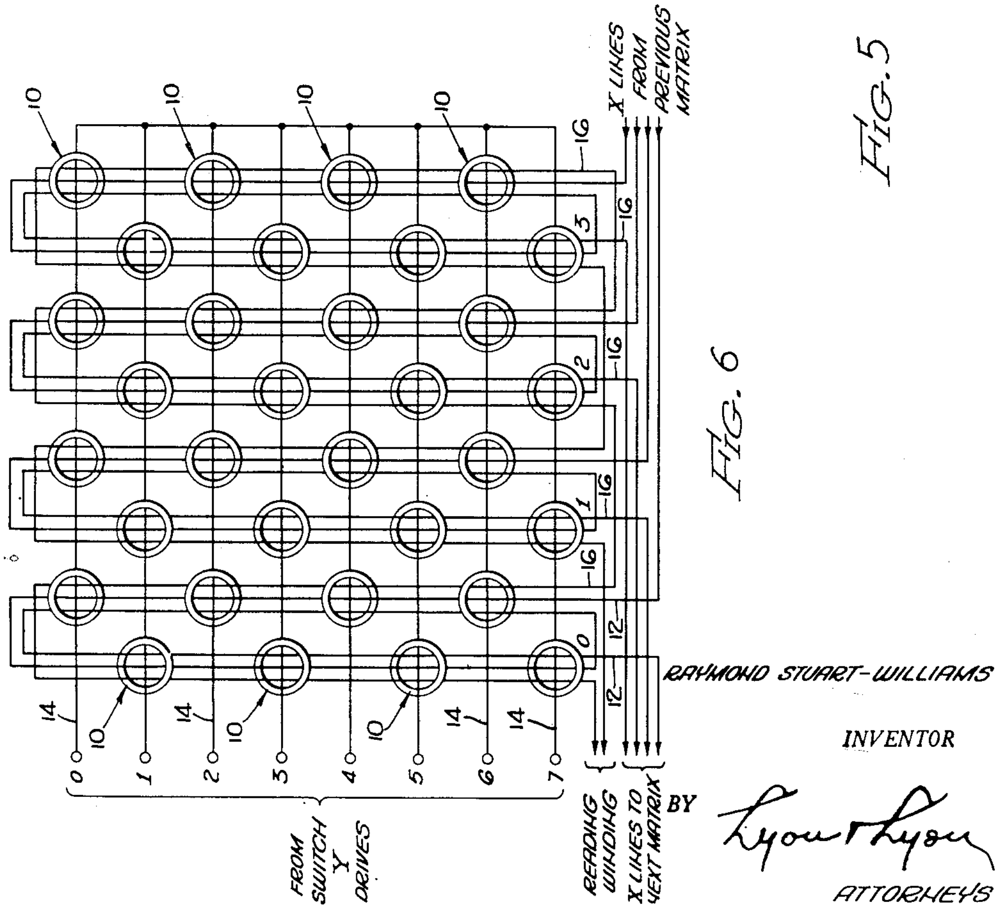
Figure 6 is a schematic diagram of a magnetic core memory showing a different core disposition but embodying the principles of a rectangular array.

In order to show the reading winding more clearly, reference is made to Figure 6, which is a schematic drawing of a 4 x 6 matrix. The columns are "folded over," as it were. In other words, instead of a column consisting of eight aligned cores 10, it consists of four of the eight cores disposed alongside of and in an offset manner from the other four cores. However, each column coil 12 still winds through all eight cores in series. The advantage of this form of core layout is that it permits easier assembly, smaller and noninductive winding arrangements, and the bringing out of all X lines to one side. There are two column coil turns through every core, one row coil turn, and one reading coil turn. The reading coil 16 goes up through the cores in column zero (up through the core hole in the first four cores and up through the hole in the last four cores) through the cores in column two, through the cores in column three, and back through the cores in column one. If the sense of the reading winding is examined in an X direction, it will always be the same. If the sense of the winding is examined in the Y direction, it will be "checkerboarded," i. e., voltages induced from all the cores in a row will oppose and cancel each other. If a memory in three dimensions is desired, then a plurality of these core planes may be employed with the corresponding X lines of all the core planes being connected in series and the Y lines being brought out to a side.

Figure 7:
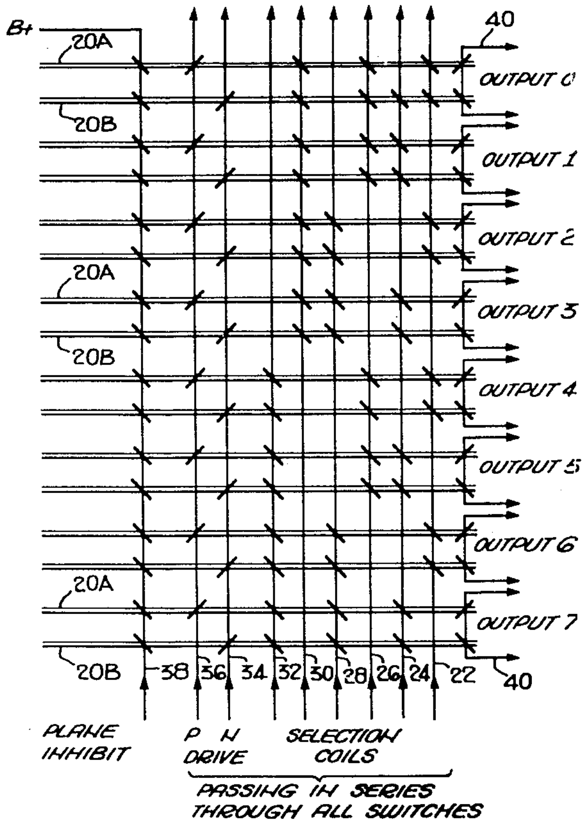
Figure 7 is a schematic diagram of a magnetic core switch suitable for driving a magnetic memory in accordance with the requirements of one program.

A schematic diagram of a switch which is suitable for providing Y line pulses of the type shown in Figure 4, curves B, C, and D, is shown in Figure 7. An "eight-way" switch suitable for use with the 4 x 8 memory shown in Figure 6 may be seen. As with the size of the memory described herein, the numbers chosen are by way of example only and are not to be construed as a limitation. Switches or memories of any desired size may be built employing the principles herein described.

The switch uses two magnetic cores 20A, 20B for driving each row coil. These cores are represented by two parallel horizontal lines. A number of coils 22–38 pass through the holes in all the switch cores. These are represented by vertical lines. Whether or not one of these coils is coupled to a core and the sense of such coupling is represented by a line crossing the intersection of the coil and core at an angle. An acute angle to the left represents a coupling whereby current in the coil tends to drive the core to N. An acute angle to the right represents a coupling whereby current in the coil tends to drive the core to P. An output coil 40 is coupled at each position to the two cores 20A, 20B in an opposing sense. The output coil 40 is also coupled to a row coil 14 in the memory. There is a "plane inhibit" coil 38 which is coupled to all the cores in the switch in an N direction. Six selecting coils 22–32 are shown which are coupled to the various switch cores in a desired combinatorial fashion in an N going direction. There area P drive coil 36 and an N drive coil 34, both coupled to alternate cores in a P drive direction.

In operation, the selecting coils as well as the plane inhibit coil are always excited and always have sufficient excitation so that any one of them maintains the cores to which they are coupled at N. A row coil is selected for excitation by cutting off all the current in the selecting coils coupled to the two cores at the selected row coil position and also the excitation applied to the plane inhibit coil. At the proper time, the P coil is excited applying a P drive to one of the two cores 20A at the position driving this core to P and inducing a P drive pulse in the row coil. The P drive pulse is terminated when desired, and, subsequently, for writing P or, still later, for writing N, a drive is applied to the N drive coil. This drives the second core at the position to P, inducing an N pulse in the output coil. Then this pulse is terminated and current is restored to the selecting cores and plane inhibit coil. This drives both cores back to N together, but, because of the opposing coupling in the output coil, the voltages induced as a result cancel.

The drive to the various coils of the switch may be by tubes (not shown). One switch is required for each core plane. However, the switches are addressed in parallel through their selecting windings in order to excite the same row coil in each memory. The plane inhibit coil 38 finds use when it is desired to inhibit a row coil excitation, even though the address has been established and proper P and N drives have been applied. It can also be used to determine whether a core is set to P or N. After a P coil is excited and its excitation terminated, the plane inhibit coil can be excited to reset the core driven by the P drive coil to N. This induces an N drive pulse in the output coil. Also a subsequently applied N coil drive has no effect. Preventing a drive from the plane inhibit coil can permit the N drive coil to take effect. Thus excitation or not of the core plane inhibit coil can determine the polarity of a memory core when drives are always applied to the P and N drive coils in the sequence determined by curves B and D in Figure 4.

The P and N drives can be made common to a large number of switches, which can be used to drive a corresponding number of magnetic arrays where storage in three dimensions is desired.

The switch described has been shown by way of example only and is not to be interpreted as a limitation upon the invention. Other switches using a single core per coil position may also be employed here which are of the type described by Rajchman in the article by him previously cited herein.

Figure 8:
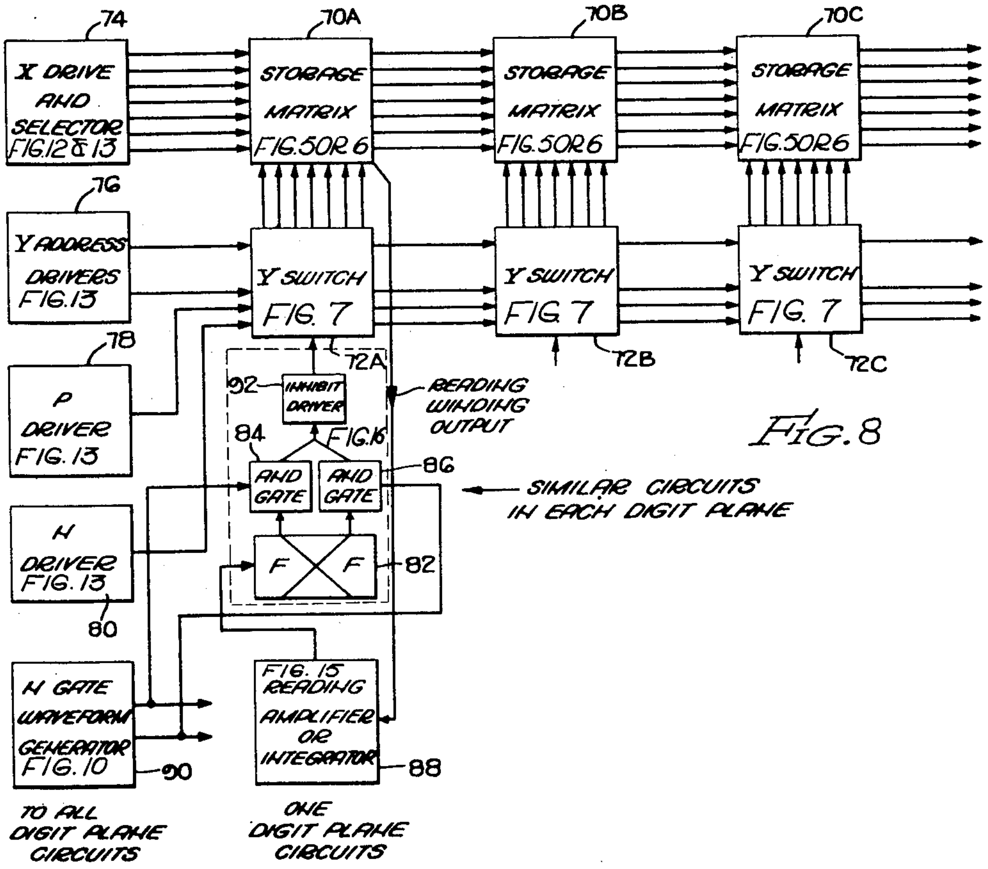
Figure 8 is a schematic diagram of a three-dimensional magnetic memory system.

Figure 8 is a schematic diagram of a three-dimensional array which incorporates the principles described heretofore. It comprises, by way of example, at least three rectangular storage matrices 70A, 70B, 70C, of the types shown in Figures 5 or 6, each of which has cores arranged in columns and rows. There are more rows than columns, although, of course, this could be reversed, in view of the fact that there are many more cores in a column than in a row; the row coils (not shown) are each coupled to a switch element in a row switch which is designated as a Y switch 72A, 72B, 72C. A Y switch is provided for each storage matrix. These Y switches may be of the type shown in Figure 7. The column coils (not shown) of each matrix are connected in series with the corresponding column coils in the other matrices. The column coils are driven from the rectangle labeled X drive and selector 74. This unit generates an accurately controlled waveform corresponding to the one shown in Figure 9A and switches it so that it flows in the selected X line of all of the matrices in cascade. The Y switches 72A, 72B, 72C provide waveforms in accordance with the waveforms B, C, and D in Figure 4. The Y address drivers 76 select the selecting coils in the Y switches which are to be cut off and thus select the switch core positions and the row coil in each storage matrix which is to receive current pulses. The Y address is usually set up in advance.

By way of example, in the rectangular memory matrices including 32 columns or 32 X lines and 128 rows or 128 Y lines, the address to the X selector 74 may be fed as five binary digits and to the Y address driver 76 as seven binary digits. These seven binary digits may be decoded to select there out of 16 tubes which are to be cut off. These 16 tubes are the selecting coil drivers for the Y switches. As previously stated, this leaves one core in each of the Y switches 72B, 72B, 72C which is not inhibited. The P driver 78 is operated to provide wave shape B in Figure 9 at a time after the disturbance caused by the application of the X drive wave form to the storage matrices has subsided. By connecting in series all of the P drive coils, a common P driver 78 may be provided for the memory system. The P driver causes all selected switch cores to be driven simultaneously to P, and, accordingly, the selected cores in each matrix which are coupled to the driven row and column coils are driven to P.

Figure 9:
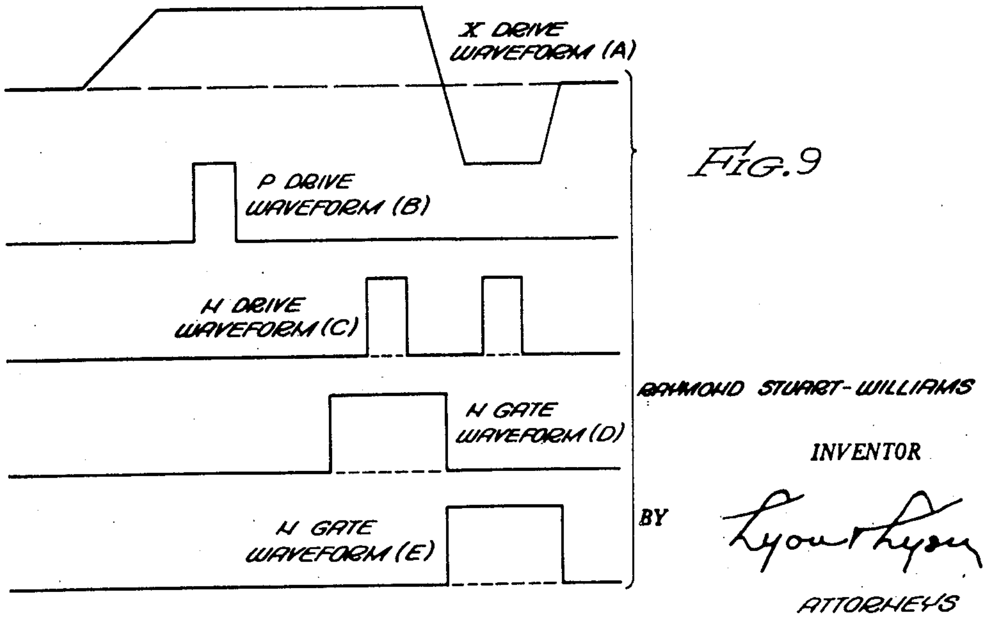
Figure 9 is a wave shape diagram showing the wave shapes required in the operation of the system shown in Figure 8.

If it is desired to read the conditions of the core being driven, this reading occurs over the interval of the P drive. It will be noted that any effects due to the X drive have subsided by the time the P drive is applied to the row coils. If it is desired to leave the core in P, then the N driver 80 provides a pulse at the proper time to the Y switches which have all their N driver coils in series. Each switch then provides current to the selected row coil. The N driver 80 also provides a second pulse, as shown in Figure 9, during the time when the X drive current has reversed. To leave the memory core in P, this second pulse must be inhibited. To leave the core in N, the first pulse must be inhibited. The operation of the apparatus to effectuate these results will become more clear with the description of the reading process.

When it is desired to read, as previously stated, the reading occurs during the period of P drive to the switch. Each switch has circuitry as shown in Figure 8, consisting of a flip-flop 82 with two And gates 84, 86 coupled to the outputs and a reading amplifier and integrator 88, whose output drives the flip-flop. The reading amplifier includes an integrator and it is driven by the reading coil of the associated core plane. Only one N gate waveform generator 90 is provided for the entire memory. This N gate waveform generator provides two output pulses which occur at a time relative to the waveforms C as shown in Figure 9 by waveforms D and E. Each of these is applied over a separate line to one of the two And gates and whichever one is primed by the flip-flop passes the N gate waveform to the inhibit coil driver 92 for the Y switch. The N gate waveform generator serves the purpose of generating waveforms which are applied to the inhibit coil driver to inhibit either the first or the second of the N-driver pulses being applied to the switches so that a memory core is left either in P or driven to N. The inhibit coil driver 92 drives the inhibit coil shown in the switch in Figure 7. During the period of the P drive waveform B in Figure 11 any signal induced in a storage matrix reading coil is integrated and the output is applied by the reading amplifier 88 either to set the flip-flop so that the first And gate is opened, thus inhibiting the switch during the period of the first N drive waveform or the flip-flop receives no signal from the reading amplifier (indicative of the condition P of the storage core), whereby And gate 2 permits inhibiting of the N drive during the second N drive pulse. Thus the output of the reading amplifier applied to the flip-flop determines which of the two N drive waveforms is applied to the switches and thereby whether a storage core in a particular core plane is set to P or N. Obviously, for initially writing in a core plane the condition of a selected core is very readily established by setting or resetting the flip-flop.

It will be noted that this system has the advantage that the only precision current driver circuits required are one for the X drive and one each for the P and N drive. All other drivers are truly digital in operation since it is only required that they provide enough current. Any excess of the required amount of current does not upset the system.

Other switching systems and other waveform generators may be used in place of the one shown herein to generate the current waveforms of the type shown in Figure 4 to provide a program which minimizes delta effects. The showing of the system herein is by way of example for carrying out the reading and writing cycles for the memory and is not to be construed as the only one capable of carrying out this program. The articles previously referred to show other switches also capable of being driven to carry out the required waveform program.

Figure 10:
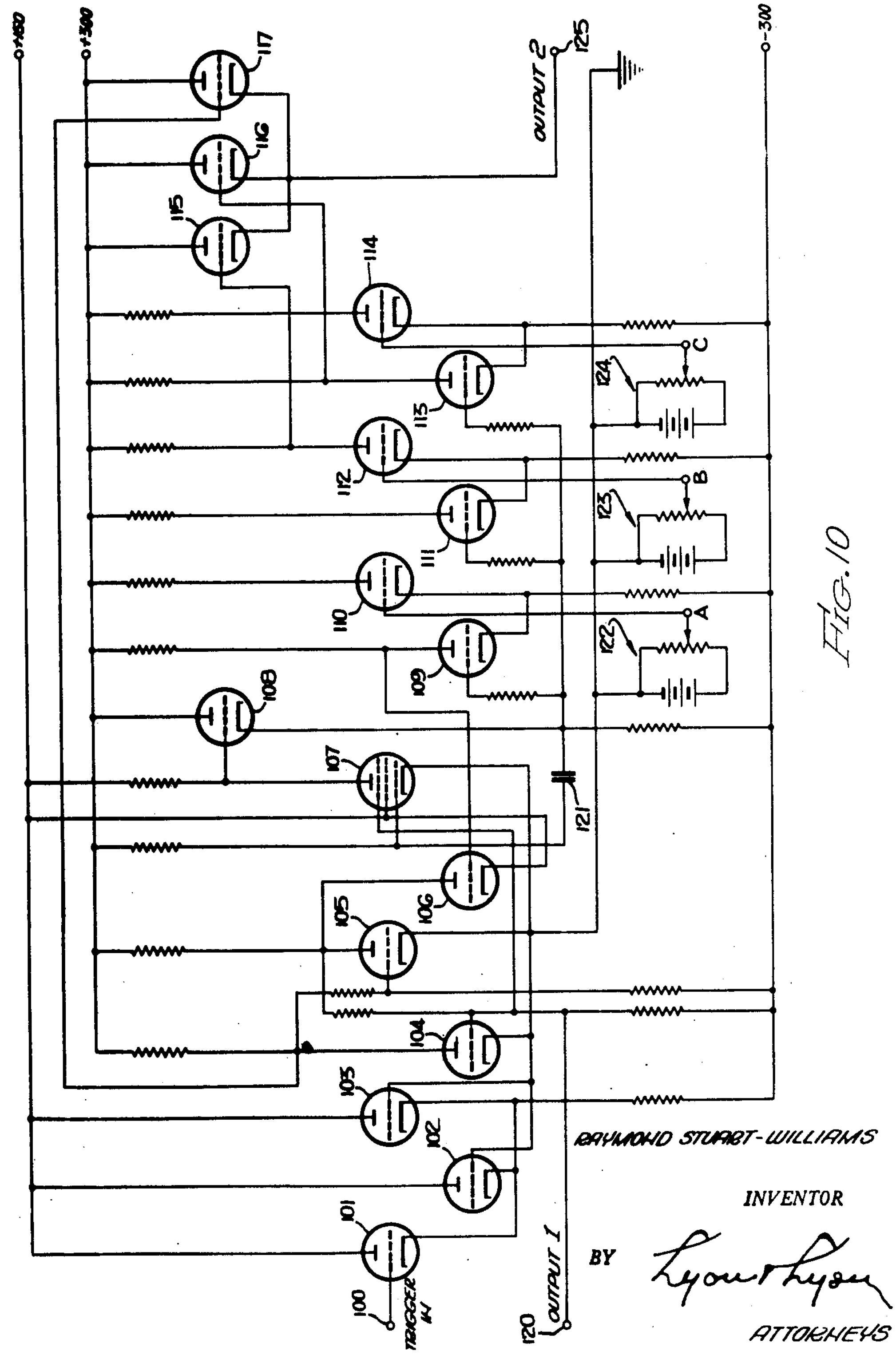
Figure 10 is a circuit diagram of a timing wave shape generator suitable for providing the timing wave shapes required for operation of a magnetic core matrix memory.
Figure 11:
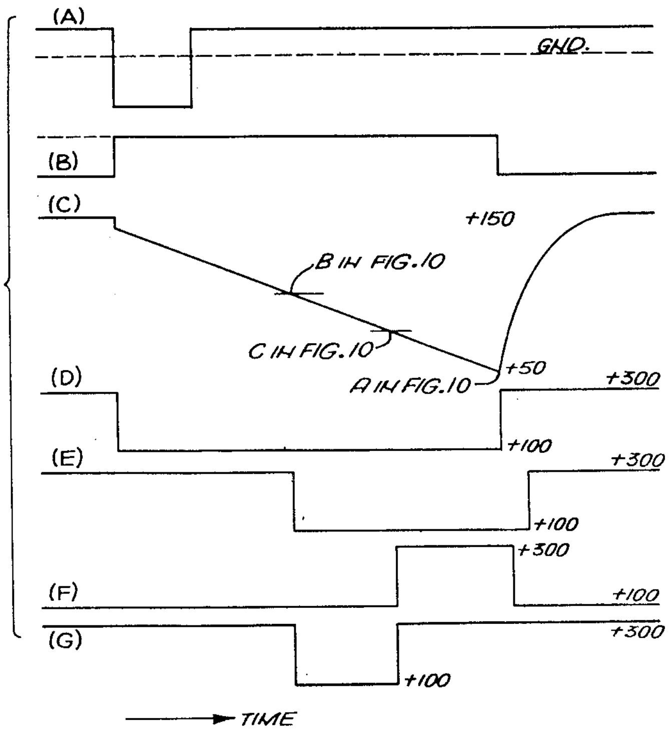
Figure 11 shows the wave shapes obtainable with the circuit drawn in Figure 10.

Reference is now made to Figure 10, which is a circuit diagram of a waveform generator capable of generating the waveforms required to time the operation of the system shown in Figure 8. Figure 11 shows the waveforms which are generated by the operation of the circuits shown in Figure 10.

A pulse shown in Figure 11 as waveform A generated by a source (not shown) is fed via a terminal 100 to the grid of a tube 101 to drive it to cutoff. A tube 102 has a cutoff bias applied to its grid and, hence, the potential at the common cathode connection of tubes 101, 102, and 103 falls, causing tube 103, which has its grid grounded, to conduct. Tubes 103 and 104 have a common anode load resistor, so that when tube 103 conducts this causes the anode of tube 104 to fall in voltage. The grid of tube 105 is connected to the plate of tube 104 and receives the negative-going signal, and, consequently, the plate of tube 105 rises. Tubes 104 and 105 have cross-connected plates and grids in the form of a bistable multivibrator. The grid of tube 104, which rises when the plate of tube 105 rises, is also connected to (1) the grid of tube 102, (2) the suppressor grid of tube 107, and (3) a first output terminal 120. Thus from tube 104 a positive potential is applied to the grid of tube 102 to cause it to conduct. This drives tube 103 to cutoff, thus holding tubes 104 and 105 and disconnecting the pulse source from the circuit. The waveform at the grid of tube 104 shown in Figure 11B is applied to the first output terminal to indicate to associated circuitry that a storage cycle is in process. Tube 107 is biased so that it will not conduct until the pulse waveform 13B is applied to its suppressor grid from the grid of tube 104. The plate of tube 107 then draws current, depressing the grid of tube 107 via tube 108 and the feedback condenser 121. Tubes 107 and 108 are connected in the form of a conventional Miller sawtooth generator with cathode follower output. This type of circuit is shown and described in detail in Electronic Instruments by Greenwood et al., page 81, published by the McGraw- Hill Book Company. The voltage at the cathode of tube 108 falls linearly as illustrated by waveform 11C. The grid of tube 110 is biased from a source 122 to be at potential designated by an A in Figure 11, which is about 50 volts. When the voltage at the cathode of tube 108 falls below the potential A, tube 109, which has its grid connected to the cathode of tube 108 and its cathode connected to the cathode of tube 110, is cut off and tube 110 conducts. As the plate of tube 109 rises, it applies a positive-going voltage to the grid of tube 106, causing it to conduct, thereby resetting tubes 104 and 105 to their initial state. This causes the suppressor grid of tube 107 to become negative again, and the plate of tube 107 rises, bringing along the cathode of tube 108. As a result of this operation, a waveform shown by 11D is produced at the plate of tube 104. Tubes 111 and 112 and tubes 113 and 114 operate in similar fashion and are similarly connected as are tubes 109 and 110, except that the grids of tubes 112 and 114 are biased at potentials B and C from respective sources 123 and 124. These potentials are between the B+ on tube 108 and potential A. The plate of tube 112 produces waveform E in Figure 11 and the plate of tube 113 produces waveform F in Figure 11. Waveforms D, E, and F in Figure 11 are combined in the And gate circuit provided by tubes 115, 116, and 117 to produce waveform G in Figure 11. The three tubes have a common cathode connection which is also connected to an output terminal 125. The three tubes have their grids respectively connected to the anodes of tubes 112, 113 and 104. In standby condition, tubes 115 and 117 are conducting, tube 116 is cut off, and a positive voltage appears at the common cathode. The negative outputs from tubes 104 and 112 render all three tubes cut off and the common cathode potential goes negative. This condition exists until tube 113 is cut off and applies a positive-going pulse to tube 116. This causes tube 116 to conduct and the cathode potential goes positive again (waveform G in Figure 11).

Waveform C is a typical timing waveform. By placing a tube circuit such as 111 and 112 at each voltage corresponding to each time transition, i. e., the time required for the integrator to fall to that voltage, it is possible to have waveforms such as E and F in Figure 11 available at each transition point. These may be combined in tube circuits such as 115, 116, and 117 to form waveforms having desired starting times and durations, such as those shown in Figure 9. Where waveforms must rise or fall slowly, a series resistance and a shunt capacitance at the grids of and And gates will provide the necessary slow rise and fall.

Figure 12:
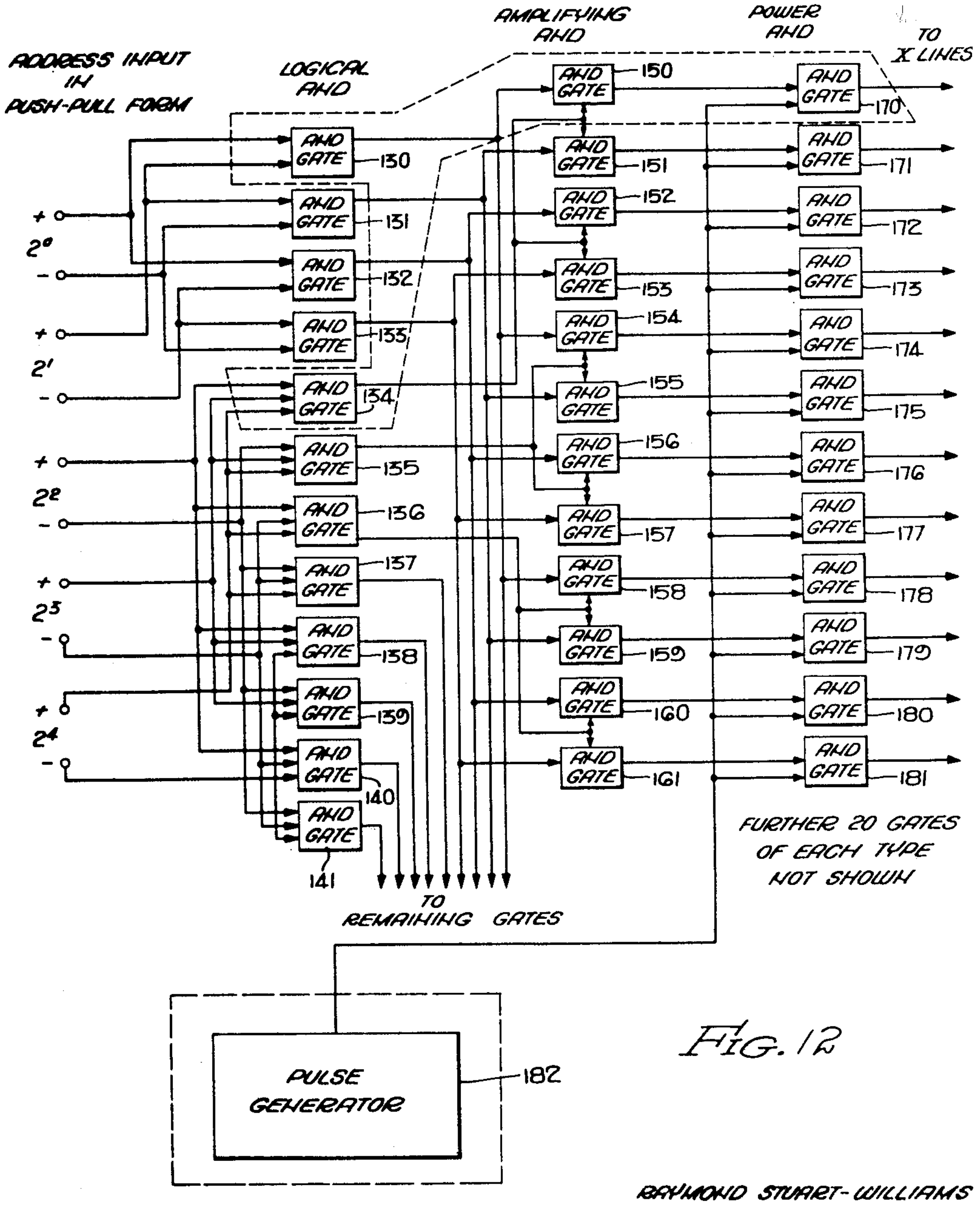
Figure 12 is a logical schematic diagram of the system for addressing the memory column coils.

Figure 12 is a logical diagram of the switching circuits required to select a desired column coil out of the 32 in the 32 x 128 matrix used as an illustration. Because of the use of the rectangular matrix, the number of column coils is considerably reduced and, hence, direct drive, using vacuum tubes, is feasible. Direct drive has the advantage that extremely accurate control of the driving current pulse is possible. The system also has the further advantage that the X pulses rise and fall very slowly. Therefore, it is possible to have many turns linking the cores in the X direction and the current that is necessary is small. The portion of the schematic circuit shown inside the dotted lines is shown in detail in Figure 13.

Five pairs of input address lines are employed for selecting the one out of 32 column coils to be driven. Push-pull signals are applied to these lines. These are readily obtained from trigger circuits (not shown), one for each pair of lines.

The five pairs of input address lines $\pm 2^0$, $\pm 2^1$, $\pm 2^2$, $\pm 2^3$, and $\pm 2^4$ are decoded into a one-out-of-four form and a one-out-of-eight form by connections to the logical And circuits 130—141 of Figure 12. Tubes 226 and 227 (Figure 13) are one of the four one-out-of-four and have decoding circuits, and tubes 223, 224, and 225 represent one of the one-out-of-eight circuits. These are the normal type of common cathode coupled logical And circuits, in which the signals applied to all input grids must be negative in order to obtain a negative output from the cathode. These And gates are more fully described in High Speed Computing Devices by Engineering Research Associates, published by the McGraw-Hill Book Company.

The amplifying And gates 150—161 are exactly the same circuitry as the logical And gates, except that tubes 228 and 229, the actual gate, have their common cathodes connected to the cathode of a tube 230 which is a grounded grid amplifier. Thus the And gates drive the grounded grid amplifier. This tube, in turn, drives a normal amplifier 231. It is arranged that the output of tube 231 is normally at −200 volts and moves to +300 volts when quintuple coincidence of negative signals occurs on grids of tubes 223, 224, 225, 226, and 227. This, of course, requires a simultaneous application of inputs on the $+2^0$, $+2^1$ lines to tubes 223 and 224 and $+2^2$, $+2^3$, $+2^4$ to tubes 225, 226, 227.

The plate of tube 231 is direct coupled via resistors 232 and 233 to the grids of tubes 211 and 212. Since there are only 32 possible combinations of five bits, there must always be one pair of tubes, such as tubes 211 and 212, with their grids positive with respect to their cathodes. The circuit of tubes 231, 211, and 212 has been designated as a power And gate 150. Tubes 211 and 212 are in series with each other. A tube 210 is in series with the plate of tube 211 and a tube 213 is in series with tube 212. The tubes 211 and 212 of the remaining power And gates 171—181 are connected in parallel with the tubes 211 and 212 shown. Output to a column coil (X line) is taken from the connection between the cathode of tube 211 and the plate of tube 212. When an address has been set up, tubes 211 and 212 have a conducting bias applied to their grids from tube 231 if their particular logical And gate is selected. The tubes are not conducting, however, as tubes 210 and 213 in the X pulse generator 182 have a negative bias applied to their grids and are cut off. Hence, the common plate line of all tubes, such as 211, and the common cathode line of all tubes, such as 212, in all the power And gates in standby condition are very near ground potential.

A positive input pulse is fed to input terminal 200 and thence to the suppressor grid of tube 203. This tube is connected as a Miller integrator and is biased to draw plate current only upon application of an input to the suppressor. The plate, however, will not rise higher than 320 volts by action of clamping diode 202. The positive input pulse is fed from the timing generator, such as shown in Figure 12 and commences at time $T_0$ and finishes at time $T_6$ of Figure 4. When the pulse is first applied, the plate of tube 203 falls linearly until it is stopped by the clamping action of diode 201. The plate of this diode is set at about 200 volts; this potential is made adjustable, as it determines the ultimate pulse amplitude. The plate of tube 203 remains at 200 volts until $T_6$, when the input pulse goes negative, cutting off plate conduction in tube 203. The plate of tube 203 then rises more rapidly than it fell as the Miller effect is disconnected by virtue of the negative pulse being applied to the suppressor grid. Thus a slow-rising, flat-topped, fast-fall pulse required for the positive part of waveform A of Figure 4 is shaped and standardized.

The plate of tube 203 is direct connected to the grid of tube 205. Tubes 205 and 206 with a common cathode connection to tube 207 anode constitute a "long-tailed pair" comparator, with tube 207 arranged as a constant current tube in their common cathode line. This arranges that the sum of the currents drawn by tubes 205 and 206 must be the same, whatever the potential of their cathodes, over quite a wide range (in this case from about +100 volts to +400 volts). Initially, in standby condition the grid of tube 205 is at +320 volts. The grid of tube 206 is connected to the plate of tube 210 and hence is biased at 300 volts or less. Hence the plate of tube 206 is at +100 volts and tube 209, which has its grid connected to the plate of tube 206, is conducting. Hence the plate of tube 209 is at a low potential of about −200 volts and tube 210, which has its grid connected to the plate of tube 209, is cut off.

The voltage at the grid and hence the cathode of tube 205 drops, when a positive pulse is applied to the input terminal 200, until tube 206 commences to conduct. The plate of tube 206 then falls, causing the plate of tube 209 to rise until tube 210 commences to conduct, thereby depressing the grid of tube 206. Thereafter, the grids of tubes 205 and 206 remain at the same potential with respect to each other, and the pulse appearing at the plate resistor of tube 210 substantially resembles the pulse being applied to the grid of tube 205. Since tube 210 is permitted to conduct and tube 211 is biased to conduct, current flows through tubes 210 and 211 through the selected column coil to ground. This output current is directly proportional to the standardized pulse being applied to the input terminal 200. At time $T_6$ tube 203 is cut off, causing tube 210 to cut off, and current through the column coil is terminated.

At time $T_{12}$, a negative-going pulse is applied to input 200A. This pulse terminates at time $T_{10}$. It is applied to the grid of a tube 215, which is driven toward cutoff. Accordingly, a positive-going pulse appears at the plate of tube 215. The condenser 214, which is connected between plate and cathode, serves to slow up the rising and falling edges of the positive pulse. This pulse is standardized between the limits of −320 and −200 by clamping diodes 216 and 217. Tubes 218, 219, 220, 221, and 213 are arranged and connected to operate in a similar manner as respective tubes 205, 206, 207, 209, 210, and 211. The only difference is in the bias applied to the tubes. They are operated below ground so that energization of tube 213, which is in the cathode lines of all the 32 tubes numbered 212, will permit current to flow through that tube 212 which is biased to conduct by the address circuits. The action that follows upon application of a standard pulse to the input is similar to the feedback action described above, with the result that the current flowing in tube 213 is proportional to the standardized pulse. This current flows through tube 212 to the matrix. Current flows either through tube 211 or through tube 212 to the matrix, but at different times, as tubes 210 and 213 never operate at the same time. Thus the positive and then negative wave shape required for the X lines is made available.

Figure 13:
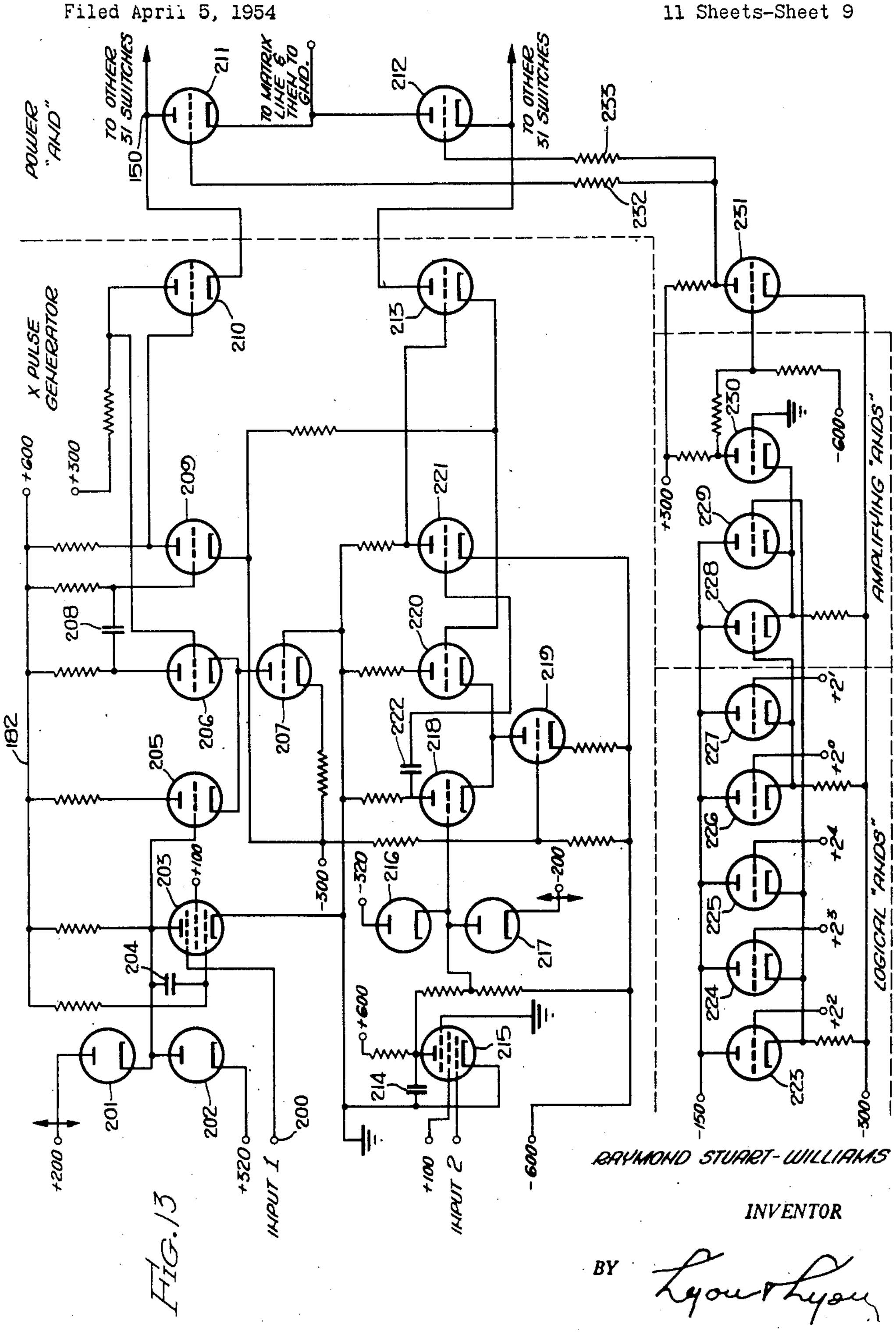
Figure 13 is a circuit diagram of some of the basic circuit components shown in Figure 12.

The Y address drivers 76 (Figure 8) involve logical And circuits (not shown) of the type represented by tubes 223 through 227 of Figure 13 and their attendant circuitry. Sixteen possible outputs are obtained from seven binary digit push-pull inputs. These are made available to cut off three of sixteen tubes used to drive sixteen selecting coils which are required for each Y switch. Cutting off the current to three coils cuts off the selecting coil N drive at one of the 128 core positions required to drive the 128 rows in each core plane. These three outputs are obtained as two "one-out-of-four" outputs and a "one-out-of-eight" output. Three of the sixteen required driver tubes are cut off for every possible address.

The P and N drivers 78, 80 (Figure 8) each have circuitry similar to that shown for tubes 213 to 221, inclusive, of Figure 13. The N gate waveform generator 90 has circuitry shown and described in Figure 10. It is to be noted that the N gate waveforms may be obtained directly from the timing unit along with the other required timing waveforms in the manner explained for Figure 8.

Figure 14:
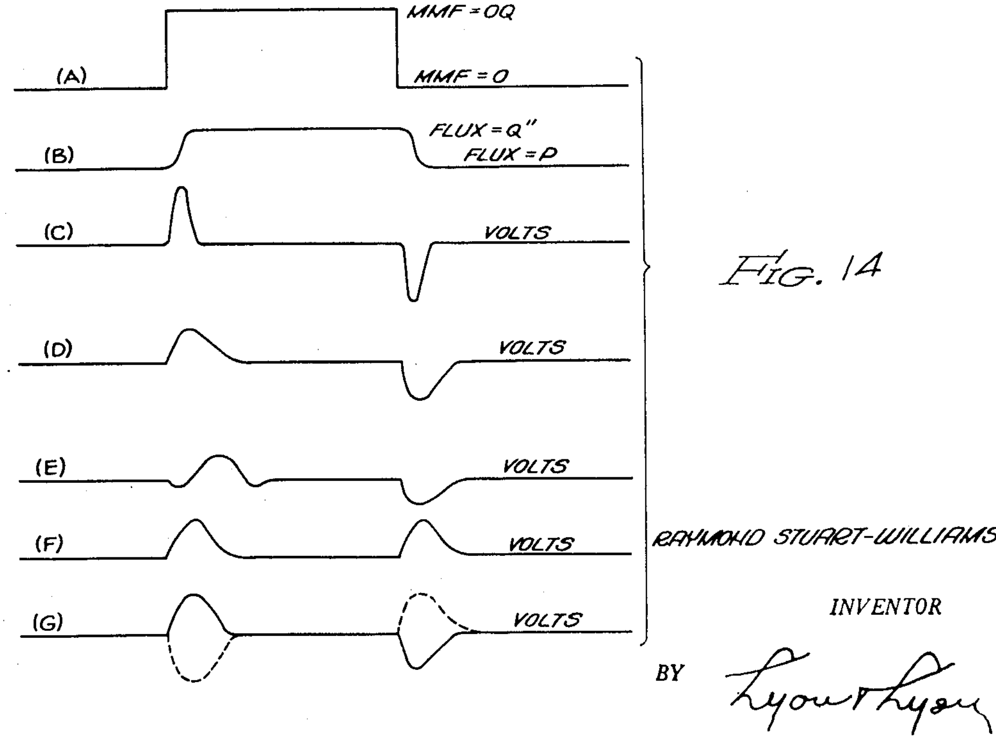
Figure 14 shows typical waveforms obtained in the reading coil of a memory.

*The reading process.*—It was explained previously herein that it is proposed to integrate the signals from the matrix so that discrimination is on a flux basis. It is necessary for this method to integrate over the entire time of the flux excursion. This can be seen by regarding Figure 2 and from the following explanation. Let the core that is to be read first be at P. It is then driven to Q″ by a ½P drive and then back to P. Over the entire action there is no flux change, but the negative change corresponding to Q″P occurs after the driving current pulse has finished and the core is permitted to return. The waveforms corresponding to this are shown in Figure 14, where waveform A represents the ½P driving current, waveform B, the flux excursion, and waveform C, the voltage induced in a reading coil coupled to the core. Not until some time after the second voltage pulse shown in waveform C subsides can an integrator provide the correct output. Thus, in any practical circuit, integration must commence at the same time as the activating current pulse commences and must not be completed until all disturbance due to the removal of the activating pulse has subsided.

In view of the checkerboarding of a reading coil, the signals obtained from the matrix have either polarity. Thus, it is necessary to incorporate in the reading circuits some device which inverts signals of one polarity but not of the other. This process has been termed rectification. In any reading circuit of the type required with this system, there must be three components: an amplifier, an integrator, and a rectifier. In theory, these may be placed in any desired order, but in practice it has been found that the greatest accuracy with the least number tubes can be obtained if the elements are arranged as amplifier, rectifier, and integrator. If this order is followed, however, great care must be taken in the method of rectification that is employed.

Two typical output signals from a reading coil when a selected core is in the P state before reading is commenced are shown in Figure 14 waveforms D and E. Either of these pulses can occur if different information is stored in the matrix. In practice, however, waveform E occurs only if delta effect is bad. Waveform F shows the result of rectification of the voltages represented by waveform E by using diodes to rectify both the positive and negative peaks. Upon integration, the result is that instead of getting nearly zero output from the integrator as should be the case for the magnetic excursion the output is the sum of the area of the two pulses shown in waveform F. Accordingly, in order to obtain a correct result if integration is used, a "rectification" is required which preserves the relative polarity sense of the voltages being rectified so that the voltages produced may be algebraically added by the integrator to provide the proper answer.

The necessary type of "rectification" action for obtaining a proper result is shown in waveform G. Whether the initial waveform obtained in a reading coil is shown by the full line or by the dotted line after "rectification," it must appear at the output of the reading coil as the full line. Thus the necessary action to compensate for the effects of the checkerboarded reading winding has been provided, yet the initial relative polarity sense of the voltages induced has been preserved.

This action, however, is not true rectification and, in fact, any circuit using the nonlinear characteristics of a tube in a rectifying manner cannot provide the required output. The only process that can be employed to obtain the result shown in Figure 14G is obtainable by a process of selection. It will be recalled that in the description herein of the magnetic core memories shown in Figures 5 and 6 the reading coil was checkerboarded in the Y direction only. Thus, if using the illustrative memory of 32 x 128, the columns are numbered from zero to 31 and using this reading coil winding scheme, the polarity of an output voltage induced in the reading coil can be determined from the column address as follows:

| Address Decimal | Binary Address | Polarity of Output |
|---|---|---|
| 0 | 00000 | + |
| 1 | 00001 | − |
| 2 | 00010 | − |
| 3 | 00011 | + |
| 4 | 00100 | + |
| 5 | 00101 | − |
| 6 | 00110 | − |
| 7 | 00111 | + |
| 8 | 01000 | + |
| 9 | 01001 | − |
| etc. | | |
| 30 | 11110 | − |
| 31 | 11111 | + |

There is no necessity for the physically first line to be the first address. Hence, if the addresses are renumbered as shown below:

| Previous Decimal Address | New Decimal Address | New Binary Address | Polarity |
|---|---|---|---|
| 0 | 1 | 000 0 1 | + |
| 1 | 2 | 000 1 0 | − |
| 2 | 3 | 000 1 1 | − |
| 3 | 4 | 001 0 0 | + |
| 4 | 5 | 001 0 1 | + |
| 5 | 6 | 001 1 0 | − |
| 6 | 7 | 001 1 1 | − |
| 7 | 8 | 010 0 0 | + |
| 8 | 9 | 010 0 1 | + |
| 9 | 10 | 010 1 0 | − |
| etc. | | | |
| 30 | 31 | 111 1 1 | − |
| 31 | 0 | 000 0 0 | + |

it will be seen that the sign of the output polarity is related to the value of the second least significant binary digit. When this is zero, the output polarity is positive, and, when this is one, the output polarity is negative. Once this is appreciated, then a switching circuit such as is shown in Figure 15 may be employed for properly "rectifying" a signal in the reading coil to preserve their true sense of relative polarity.

Figures 15, 15A:
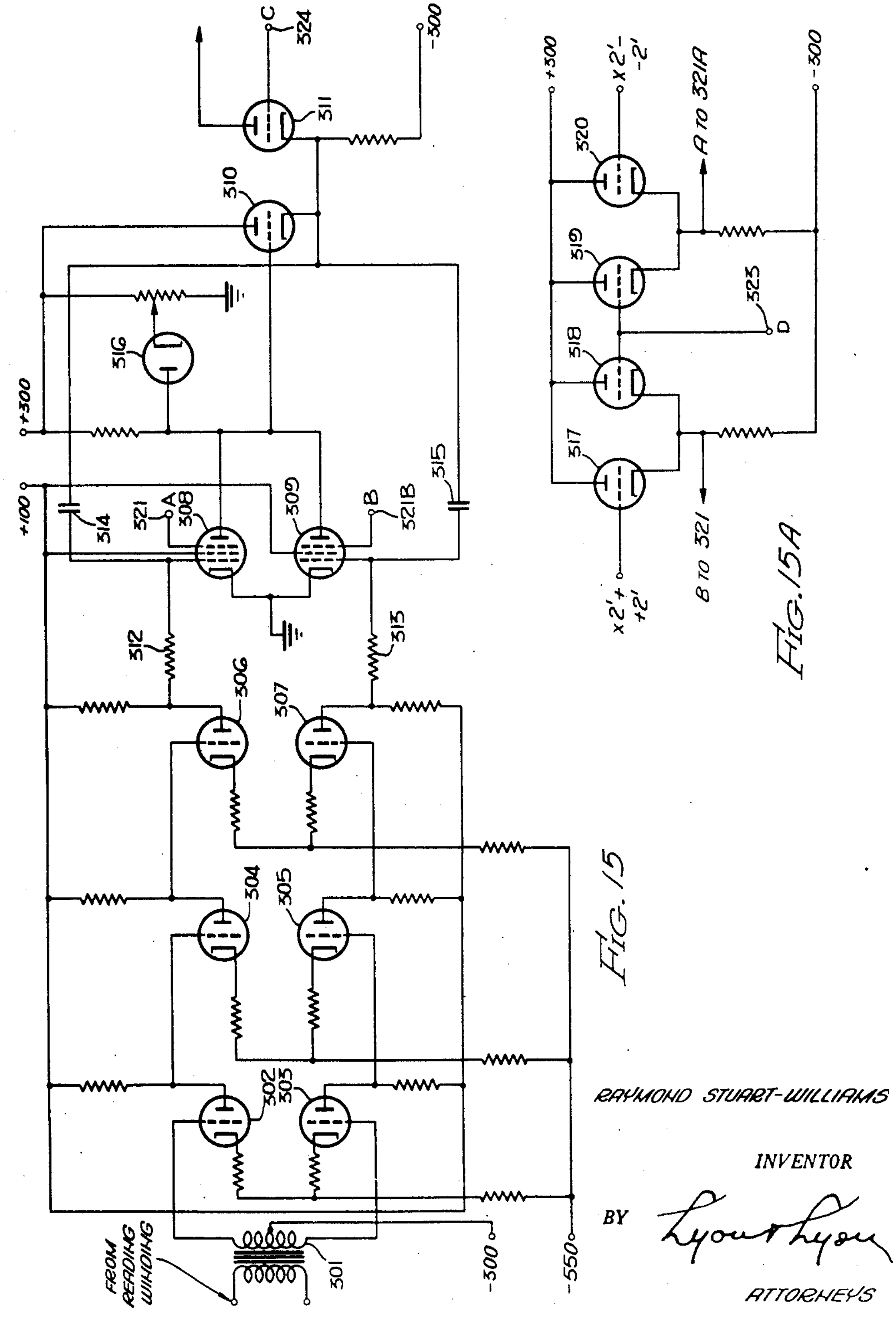
Figures 15 and 15A shows the reading amplifier integrator and attendant switching circuitry.

As shown in the circuit diagram in Figure 15, the signal from the reading winding is applied to the input transformer of a push-pull amplifier to be converted to push-pull form about a mean level of —300 volts by transformer 301. It is amplified in push-pull fashion by the direct connected high-gain amplifier constituted by tubes 302, 303, 304, 305, 306, and 307. The output from tubes 306 and 307 is direct connected via resistors 312 and 313 to tubes 308 and 309. These tubes have a common plate connection and are connected in turn to the grid of tube 310. Tube 310 is connected as a cathode follower. The output of tube 310 is fed back to the control grids of tubes 308 and 309 by capacitors 314 and 315.

Figure 17:
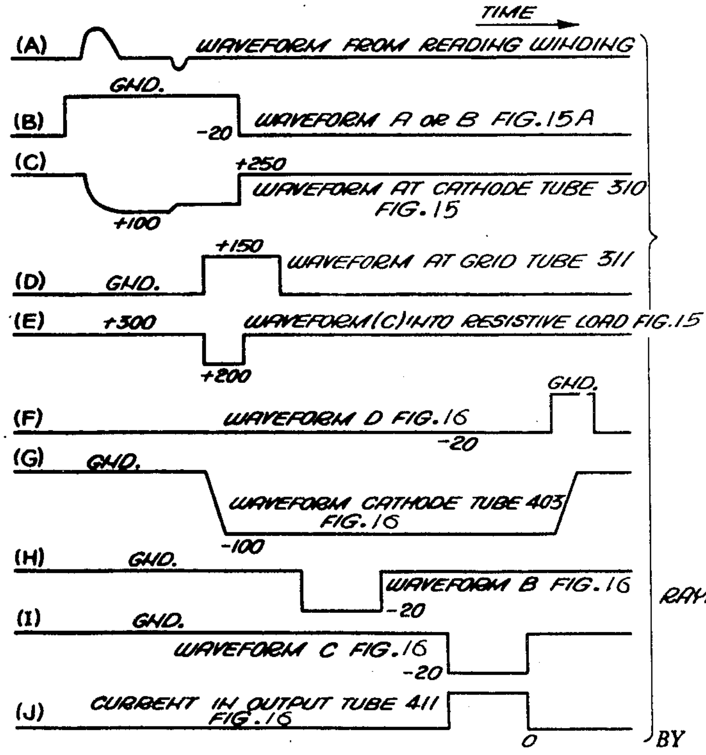
Figure 17 shows the waveforms obtained at various places in the circuits shown.

The suppressor grids of tubes 308 and 309 are respectively connected to terminals 321A and 321B to which there are applied cutoff bias voltages in the standby condition. The control grids of these tubes have a conducting bias applied from the anodes of tubes 306 and 307. Hence the respective screen grids are carrying all the tube current. The plates of tubes 308 and 309 are clamped at a positive potential defined by diode 316. A figure of 250 volts has been chosen by way of example. The grid and cathode of tube 310 in the standby condition are also at this same potential. A waveform such as shown in Figure 17B is applied to the suppressor grid of either tube 308 or 309. This waveform and selection are obtained from the circuit 317, 318, 319, 320 of Figure 15A. This circuit is common to all reading amplifiers. The push-pull lines $+2^1$ and $-2^1$ represent the second least significant digit of the X portion of an address. These have signals applied from the address generator (not shown) to the grids of tubes 317 and 320. Tubes 318 and 319 are both connected by their control grids to a terminal 323 which is connected to a pulse source (not shown). Tubes 318 and 319 are respectively connected by their cathodes to tubes 317 and 320. A pulse waveform such as shown in Figure 17B is fed to the control grids of tubes 318 and 319. Since there is an input corresponding to either $+2^1$ or $-2^1$ of the X address of a core being read, one of the gate tubes 317 or 320 will conduct and apply the waveform to tube 308 or to tube 309 in all reading amplifiers. This enables the tube selected to draw current through its plate load. The polarity of this switching is so arranged that the tube that is selected is that tube which is being fed by a positive-going signal from tubes 306 and 307.

The other tube remains cut off on its suppressor, and, hence the active portion of the circuit constitutes a Miller integrator. This may be appreciated if it is assumed, for example, that tube 309 is permitted to conduct and 308 is not. Then the integrator circuit can be traced through tubes 309, 310 and feedback via condenser 315 to the grid of tube 309. The integral of the input waveform occurs at the cathode of tube 310. When the integrator has received all the input information, which may have a waveform for a core storing an N such as shown at 17C, waveform 17D is applied to the grid of tube 311. Tube 311 has a common cathode load with tube 310. If the stored information has been a one or N, tube 311 will conduct to provide a waveform as shown by 17E. If the information stored in the core being read was zero or P, tube 311 will not conduct when waveform 17D is fed to its grid. Waveform 17D is fed to all reading amplifiers. The potential of the cathode of tube 316 is made adjustable to compensate for idiosyncracies in individual amplifiers. The reason tube 311 does not conduct when a core is read which has been storing at P will be understood from the fact that the integrator first integrates the wave shape of the voltage induced in the reading coil in a positive sense, then in a negative sense. These wave shapes are the solid line ones obtained as shown in Figure 14G. This integral is zero. A core which is at N when the reading process is begun will induce such a large voltage in the reading coil when it is driven to R' in Figure 2 that this will far overshadow the voltage induced when the core is allowed to drop to P.

Figure 16:
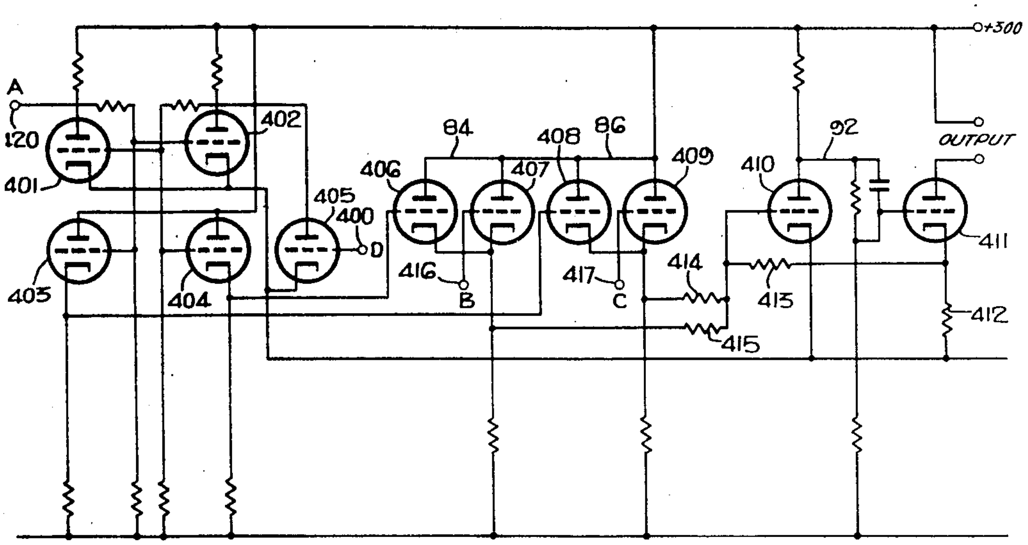
Figure 16 shows the circuit diagram for the trigger circuit and And gates required for each digit plane in a memory.

Figure 16 shows the remaining circuits required for each of the digit planes. Tubes 401 and 402 constitute a bistable multivibrator or a flip-flop 82 which is set every cycle by a pulse having a waveform represented by Figure 17F applied to tube 405 via an input terminal 400 so that tube 402 is normally conducting. If an output is received from tube 311 in Figure 15 indicative of a core being read having stored at N, this is applied via terminal 414 to cut off tube 402 and cause the tube 401 to conduct. The outputs of tubes 403 and 404, which are cathode followers respectively coupled to receive outputs from flip-flop tubes 401 and 402, convey information to the computer and also to gates 84 and 86 represented by tubes 406, 407, 408, and 409. Waveforms shown in Figure 17H and Figure 17I, corresponding to waveforms shown in Figure 11D and Figure 11E, are respectively fed to these gates via terminals 416 and 417. The gates are so arranged that the gate which operates provides the correct N restore waveform at the proper time as described for Figure 10 to the inhibit driver 92. This is fed either by resistor 414 or 415 to the grid of tube 410. Tubes 410 and 411 in conjunction with resistors 412, 413, 414, and 415 constitute a feedback current amplifier, the N restore current pulse being provided at the plate of tube 411. The inhibit or N restore coil of a switch is in series with the plate of tube 411. The current through tube 411 is shown in Figure 17J.

The method and apparatus for reading the condition of a core, whether in a single digit plane only or in the three-dimensional array have all been described in conjunction with rectangular arrays wherein reading occurs during the short pulse Y drive which is superimposed on top of the long pulse X drive. It should be understood that this is the preferred embodiment or manner of performance. The use of a push-pull amplifier followed by push-pull connected integrating circuits may also be employed for reading with the coincident pulse type of X and Y drives which are well known and presently being used. The proper integrator is turned on in accordance with the address of the selected core and during the coincident pulse drive toward P. Furthermore, the reading coil windings may be checkerboarded in both X and Y directions also. All that is required is that the proper integrator to be turned on is determined by the reading winding sense on the selected core so that the voltage first presented to the turned on integrator has the proper polarity to be integrated. In the circuits of the embodiment of the invention shown, this is positive. Obviously, the reading winding sense may still be determined from the location of the core in the matrix. It will, therefore, be appreciated that the operation of the embodiment of the invention for reading in the case of a coincident drive pulse system or double checkerboarding of the reading coil winding is substantially the same as for the system described herein. Accordingly, the principles of the invention which are explained are not to be considered as limited strictly to the embodiment of the invention shown herein.

There has been described and shown herein a novel and useful system for determining the polarity of a core in a magnetic matrix memory wherein wanted-to-unwanted reading signal ratio has been increased along with reading accuracy.

I claim:

1. Apparatus for determining the polarity of a core in a magnetic core memory system of the type including a plurality of magnetic cores each being saturable in one or the other of two magnetic polarities, means to drive a selected one of said cores to one or the other polarity as desired, and a reading coil in which voltages are induced upon a selected core being driven, said reading coil including a different winding coupled to each core in one or the other sense to minimize unwanted reading signals, said apparatus for determining the polarity of a selected one of said cores to which a drive to said one polarity is applied comprising means to convert the voltages induced in said reading coil to push-pull voltages, and means controlled in accordance with the sense of the coupling of the reading coil winding on said selected core to integrate selected portions of said push-pull voltages whereby the output of said means is representative of the polarity of said selected core.

2. Apparatus for determining the polarity of a core in a magnetic core memory system of the type including a plurality of magnetic cores each being saturable in one or the other of two magnetic polarities, means to drive a selected one of said cores to one or the other polarity as desired, and a reading coil in which voltages are induced upon a selected core being driven, said reading coil including a different winding coupled to each core in one or the other sense to minimize unwanted reading signals, said apparatus for determining the polarity of a selected one of said cores to which a drive to said one polarity is applied comprising integrating means, means to apply voltages induced in said reading coil as a result of said selected core drive to said integrating means, means to establish address signals in accordance with the location of a selected core, and means to control said integrating means with said address signals to integrate said voltages with the same relative polarities as when they were induced.

3. Apparatus for determining the polarity of a core in a magnetic core memory system of the type including a plurality of magnetic cores each being saturable in one or the other of two magnetic polarities, means to drive a selected one of said cores to one or the other polarity as desired, and a reading coil including a different winding coupled to each core in one or the other sense to minimize unwanted reading signals, said apparatus for determining the polarity of a selected one of said cores to which a drive to said one polarity is applied comprising a push-pull amplifier connected to said reading coil, means to establish address signals in accordance with the location of a selected core, and means responsive to said address signals to integrate output voltages from said push-pull amplifier resulting from the drive of said selected core with the same relative polarities as when they were induced.

4. Apparatus for determining the polarity of a core in a magnetic core memory system of the type including a plurality of magnetic cores each being saturable in one or the other of two magnetic polarities, means to drive a selected one of said cores to one or the other polarity as desired, and a reading coil in which voltages are induced upon a selected core being driven, said reading coil including a different winding coupled to each core in one or the other sense to minimize unwanted reading signals, said apparatus for determining the polarity of a selected one of said cores to which a drive to said one polarity is applied by said means comprising a push-pull amplifier connected to said reading coil, a pair of integrating networks connected in push-pull to said push-pull amplifier output, means to maintain said pair of integrating networks inoperative, and means controlled in accordance with the sense of the coupling of the reading coil winding on said selected core to render operative one of said pair of integrating networks over the interval of said drive to integrate the voltages induced in said reading coil with the same relative polarities with which they were induced whereby the output of said integrating means is representative of the polarity of said core.

5. Apparatus for determining the polarity of a core in a magnetic core memory system of the type including a plurality of magnetic cores each being saturable in one or the other of two opposite magnetic polarities, said plurality of magnetic cores being disposed in an array of rows and columns of cores, means to drive a selected one of said cores to one or the other polarity as desired, and a reading coil in which voltages are induced upon a selected core being driven, said reading coil including a different winding coupled to each core in one or the other sense to minimize unwanted reading signals, the sense of the winding on a core being identifiable in accordance with the location of said core in said array, said apparatus for determining the polarity of a selected one of said cores to which a drive to said one polarity is applied by said means comprising means to convert voltages induced in said reading coil to push-pull voltages, a pair of integrating networks, means to maintain said integrating networks inoperative, means to couple in push-pull said pair of integrating networks to said means to convert induced voltages, and means controlled in accordance with the location in said memory system of said selected core being driven to render operative one of said pair of integrating networks over the period of said drive to integrate the applied voltage from said means to convert with the same polarity sequence and with the same relative polarity with which the voltages were induced initially in said reading coil whereby the output of said integrating means is representative of the polarity of said core.

6. Apparatus as recited in claim 5 wherein said pair of integrating networks includes at least three electron tubes each having an anode, cathode and control grid, a common anode load to which the anodes of two of said tubes and the control grid of said third tube are coupled, a cathode load resistor connected to the cathode of said third tube, a first capacitor connected between said third tube cathode and the control grid of one of said first two tubes, and a second capacitor connected between said third tube cathode and the control grid of the other of said two tubes.

7. Apparatus for determining the polarity of a core in a magnetic core memory system of the type including a plurality of magnetic cores each being saturable in one or the other of two opposite magnetic polarities, said plurality of magnetic cores being disposed in an array of rows and columns of cores, means to drive a selected one of said cores to one or the other polarity as desired, and a reading coil in which voltages are induced upon a selected core being driven, said reading coil including a different winding coupled to each core in one or the other sense to minimize unwanted reading signals, the sense of the winding on a core being identifiable in accordance with the location of said core in said array, said apparatus for determining the polarity of a selected one of said cores to which a drive to said one polarity is applied by said means comprising a push-pull amplifier including a pair of push-pull output tubes, means coupling said reading coil to said push-pull amplifier input, a first and second electron tube each having an anode, cathode, first and second control grid, a third electron tube having an anode, cathode and control grid, means coupling said first tube first control grid to receive output from one of said pair of push-pull output tubes, means coupling said second tube first control grid to receive output from the other of said pair of push-pull tubes, a common anode load coupled to the anodes of said first and second tubes, means coupling said third tube control grid to said first and second tube anodes, a cathode load resistor connected to the cathode of said third tube, a pair of condensers one of which couples said first tube first control grid with said third tube cathode, the other of which couples said second tube first control grid with said third tube cathode, means to apply a cutoff bias to the second control grids of said first and second tubes, and means controlled in accordance with the location of said selected core to remove said cutoff bias over the interval of said drive from the one of said first and second tubes which will integrate all of the voltages induced in the reading coil from said selected core whereby the output from said third electron tube is representative of the polarity of said selected core.

8. Apparatus for determining the polarity of a core in a magnetic core memory system of the type including a plurality of magnetic cores each being saturable in one or the other of two opposite magnetic polarities, said plurality of cores being disposed in rows and columns of cores, a separate column coil inductively coupled to each column of cores, a separate row coil inductively coupled to each row of cores, and a reading coil including a different winding coupled to each core in one or the other sense to minimize unwanted reading signals, the sense of the winding on a core being identifiable in accordance with the location of said core in said memory, said apparatus for determining the polarity of a selected core comprising means to select a column coil coupled to said selected core, means to select a row coil coupled to said selected core, means to generate a first current pulse having a rise time on the order of the turnover time of a core and a duration on the order of a multiple of the rise time of a core, means to generate a second pulse during the plateau time of said first pulse and after any disturbances caused by the rise time of said first pulse have subsided, said second pulse having the same polarity as said first pulse and a duration on the order of a core turnover time, the amplitude of said first and second pulses together being sufficient to drive a core to saturation but being separately insufficient, means to apply said first pulse to said selected column coil and said second pulse to said selected row coil, a push-pull amplifier connected to said reading coil, a pair of integrating networks connected in push-pull to said push-pull amplifier output, means to maintain said pair of integrating networks inoperative, and means controlled in accordance with the location of said selected core in said memory as determined from the selected coils to remove said cutoff bias over the interval of application of said second pulse from the one of said pair of integrating networks which will integrate all of the voltages induced in said reading coil responsive to the application of said second pulse.

9. Apparatus for determining the polarity of a core in a magnetic core memory system of the type including a plurality of magnetic cores each being saturable in one or the other of two opposite magnetic polarities, said plurality of cores being disposed in rows and columns of cores, a separate column coil inductively coupled to each column of cores, a separate row coil inductively coupled to each row of cores, and a reading coil including a different winding coupled to each core in one or the other sense to minimize unwanted reading signals, the sense of the winding on a core being identifiable in accordance with the location of said core in said memory, said apparatus for determining the polarity of a selected core comprising means to select a column coil coupled to said selected core, means to select a row coil coupled to said selected core, means to generate a first current pulse having a rise time on the order of the turnover time of a core and a duration on the order of a multiple of the rise time of a core, means to generate a second pulse during the plateau time of said first pulse and after any disturbances caused by the rise time of said first pulse have subsided, said second pulse having the same polarity as said first pulse and a duration on the order of a core turnover time, the amplitude of said first and second pulses together being sufficient to drive a core to saturation but being separately insufficient, means to apply said first pulse to said selected column coil and said second pulse to said selected row coil, a push-pull amplifier including a pair of push-pull output tubes, means coupling said reading coil to said push-pull amplifier input, a first and second electron tube each having an anode, cathode, first and second control grid, a third electron tube having an anode, cathode and control grid, means coupling said first tube first control grid to receive output from one of said pair of push-pull output tubes, means coupling said second tube first control grid to receive output from the other of said pair of push-pull tubes, a common anode load coupled to the anodes of said first and second tubes, means coupling said third tube control grid to said first and second tube anodes, a cathode load resistor connected to the cathode of said third tube, a pair of condensers one of which couples said first tube first control grid with said third tube cathode, the other of which couples said second tube first control grid with said third tube cathode, means to apply a cutoff bias to the second control grids of said first and second tubes, and means controlled in accordance with the location of said selected core in said array as determined from the selected coils to remove said cutoff bias over the interval of application of said second pulse from the one of said first and second tubes which will integrate all of the voltages induced in said reading coil responsive to the application of said second pulse.

10. Apparatus for determining the polarity of a core in a magnetic core memory system of the type including a plurality of magnetic cores each being saturable in one or the other of two opposite magnetic polarities, said plurality of cores being disposed in rows and columns of cores, a separate column coil inductively coupled to each column of cores, a separate row coil inductively coupled to each row of cores, and a reading coil including a different winding coupled to each core in one or the other sense to minimize unwanted reading signals, the sense of the winding on a core being indentifiable in accordance with the location of said core in said memory, said apparatus for determining the polarity of a selected core comprising means to select a column coil coupled to said selected core, means to select a row coil coupled to said selected core, means to generate a first current pulse having a rise time on the order of the turnover time of a core and a duration on the order of a multiple of the rise time of a core, means to generate a second pulse during the plateau time of said first pulse and after any disturbances caused by the rise time of said first puse have subsided, said second pulse having the same polarity as said first pulse and a duration on the order of a core turnover time, the amplitude of said first and second pulses together being sufficient to drive a core to saturation but being separately insufficient, means to apply said first pulse to said selected column coil and said second pulse to said selected row coil to thereby induce voltages in said reading coil, integrating means, means to apply voltages induced in said reading coil to said integrating means, and means responsive to the location of said selected core in said array as determined from the selected coils to control said integrating means to integrate induced voltages during the period of application of said second pulse with the same relative polarities as when they were induced.

11. Apparatus for determining the polarity of a core in a magnetic core memory system of the type including a plurality of cores each being saturable in one or the other of two opposite magnetic polarities, said plurality of cores being disposed in columns and rows of cores, a separate row coil inductively coupled to each row of cores, a separate column coil inductively coupled to each column of cores, and a reading coil including a different winding coupled to each core in one or the other sense to minimize unwanted reading signals, the sense of the winding on a core being identifiable in accordance with the location of said core in said memory, said apparatus for determining the polarity of a selected core comprising, means to generate a long current pulse, means to generate a short current pulse during said long current pulse having the same polarity as said long current pulse, said long and short pulses having a combined amplitude to drive a core to saturation, means to apply said long current pulse and said short current pulse respectively to a column and a row coil which are coupled to said selected core, a push-pull amplifier connected to said reading coil, a pair of integrating circuits connected in push-pull to said push-pull amplifier output, means to maintain said pair of integrating circuits inoperative, and means controlled in accordance with the location of said selected core to remove said cutoff bias over the interval of application of said short pulse from the one of said pair of integrating circuits which will integrate all of the voltages induced in said reading coil responsive to the application of said short pulse.

12. Apparatus for determining the polarity of a core in a magnetic core memory system of the type including a plurality of magnetic cores each being saturable in one or the other of two magnetic polarities, means to drive a selected one of said cores to one or the other polarity as desired, and a reading coil in which voltages are induced upon a selected core being driven, said reading coil including a different winding coupled to each core in one or the other sense to minimize unwanted reading signals, said apparatus for determining the polarity of a selected one of said cores to which a drive to said one polarity is applied comprising means to convert the voltages induced in said reading coil to voltages having the same polarity sequence while preserving the relative differences in polarity, and means to integrate the output of said last named means.

13. Apparatus for determining the polarity of a core in a magnetic core memory system of the type including a plurality of cores each being saturable in one or the other of two opposite magnetic polarities, said plurality of cores being disposed in columns and rows of cores, a separate row coil inductively coupled to each row of cores, a separate column coil inductively coupled to each column of cores, and a reading coil including a different winding coupled to each core in one or the other sense to minimize unwanted reading signals, the sense of the winding on a core being identifiable in accordance with the location of said core in said memory, said apparatus for determining the polarity of a selected core comprising, means to generate a long current pulse, means to generate a short current pulse during said long current pulse having the same polarity as said long current pulse, said long and short pulses having a combined amplitude to drive a core to saturation, means to apply said long current pulse and said short current pulse respectively to a column and a row coil which are coupled to said selected core to thereby induce voltages in said reading coil, means responsive to the location of said selected core to convert the voltages induced in said reading coil to voltages having the same polarity sequence while preserving the relative differences in polarity, and means to integrate the output of said last named means.

14. Apparatus for integrating signals of either polarity with the same relative polarity comprising means to convert said signals to push-pull signals, a pair of integrating networks, means coupling said pair of integrating networks in push-pull to the output of said means to convert, means to maintain said integrating networks biased off, and means responsive to the polarity of a signal applied to said means to convert to remove said cutoff bias from the one of said integrating networks which can integrate the push-pull signal applied thereto with the same relative polarity as said signal applied to said means to convert.

15. Apparatus for integrating single-ended signals of either polarity with the same relative polarity comprising, a push-pull amplifier to which said signals are applied including a pair of push-pull output tubes, a first and second electron tube each having an anode, cathode, first and second control grid, a third electron tube having an anode, cathode and control grid, means coupling said first tube first control grid to receive output from one of said pair of push-pull output tubes, means coupling said second tube first control grid to receive output from the other of said pair of push-pull tubes, a common anode load coupled to the anodes of said first and second tubes, means coupling said third tube control grid to said first and second tube anodes, a cathode load resistor connected to the cathode of said third tube, a pair of condensers one of which couples said first tube first control grid with said third tube cathode, the other of which couples said second tube first control grid with said third tube cathode, means to apply a cutoff bias to the second control grids of said first and second tubes, and means responsive to the polarity of a signal applied to said push-pull amplifier to remove said cutoff bias from the one of said first and second tubes which can integrate the signal received from said push-pull output tubes with the same relative polarity as said signal applied to said push-pull amplifier.

References Cited in the file of this patent

UNITED STATES PATENTS

| | | |
|---|---|---|
| 2,430,457 | Dimond | Nov. 11, 1947 |
| 2,609,143 | Stibitz | Sept. 2, 1952 |
| 2,691,156 | Saltz | Oct. 5, 1954 |

OTHER REFERENCES

"Multi-Stable Magnetic Memory Techniques," by Goode and Lode, Radio-Electronic Engineering, December 1951.